US011869407B2

(12) United States Patent
Wang et al.

(10) Patent No.: US 11,869,407 B2
(45) Date of Patent: Jan. 9, 2024

(54) METHODS FOR COMPENSATING COLORS BASED ON LUMINANCE ADJUSTMENT PARAMETERS AND THE RELATED DISPLAY DEVICES

(71) Applicant: DYNASCAN TECHNOLOGY CORP., Taoyuan (TW)

(72) Inventors: Tsun-I Wang, Taoyuan (TW); Ching-Chun Wu, Taoyuan (TW); Chia-Liang Yang, Taoyuan (TW)

(73) Assignee: DYNASCAN TECHNOLOGY CORP., Taoyuan (TW)

( * ) Notice: Subject to any disclaimer, the term of this patent is extended or adjusted under 35 U.S.C. 154(b) by 0 days.

(21) Appl. No.: 17/733,452

(22) Filed: Apr. 29, 2022

(65) Prior Publication Data

US 2022/0358870 A1 Nov. 10, 2022

Related U.S. Application Data

(60) Provisional application No. 63/183,490, filed on May 3, 2021.

(51) Int. Cl.
*G09G 3/20* (2006.01)

(52) U.S. Cl.
CPC ... *G09G 3/2003* (2013.01); *G09G 2300/0452* (2013.01); *G09G 2320/0666* (2013.01); *G09G 2340/06* (2013.01)

(58) Field of Classification Search
None
See application file for complete search history.

(56) References Cited

U.S. PATENT DOCUMENTS 6,313,816 B1 11/2001 Kojima
8,643,589 B2 2/2014 Wang
(Continued)

FOREIGN PATENT DOCUMENTS

CN 1508771 A 6/2004
CN 104409019 A 3/2015
(Continued)

OTHER PUBLICATIONS

International Search Report and Written Opinion in International Patent Application No. PCT/CN2022/090177, dated Jun. 28, 2022, in 10 pages.
(Continued)

*Primary Examiner* — Benjamin C Lee
*Assistant Examiner* — Emily J Frank
(74) *Attorney, Agent, or Firm* — Duane Morris LLP

(57) ABSTRACT

Disclosed are methods for compensating colors based on luminance adjustment parameters and the related display devices. The present disclosure provides an electronic device. The electronic device comprises: a display comprising an array of pixels and a control circuit electrically connected to the display. Pixels in the array comprise a plurality of first sub-pixels defining a first color area in a chromaticity plane, a plurality of second sub-pixels defining a second color area in the chromaticity plane and a plurality of third sub-pixels defining a third color area in the chromaticity plane. The plurality of first sub-pixels is associated with a first primary color, the plurality of second sub-pixels is associated with a second primary color, and the plurality of third sub-pixels is associated with a third primary color. The control circuit is configured to receive an input image signal and generate a control signal to the display for driving each pixel of the display to output light in a virtual color gamut. The virtual color gamut of the display includes a first
(Continued)

1000 virtual color gamut including a first chromaticity coordinate point of the first primary color, a second virtual color gamut including a second chromaticity coordinate point of the second primary color, a third virtual color gamut including a third chromaticity coordinate point of the third primary color, and a fourth virtual color gamut. The fourth virtual color gamut is among the first, second and third color areas on the chromaticity plane and does not overlap any of the first, second or third color areas.

14 Claims, 11 Drawing Sheets

(56) References Cited

U.S. PATENT DOCUMENTS

| | | | | |
|---|---|---|---|---|
| 8,766,893 | B2 | 7/2014 | Wang | |
| 2006/0268003 | A1* | 11/2006 | Tanase | G09G 3/2003 345/603 |
| 2010/0110098 | A1 | 5/2010 | Wang | |
| 2012/0120096 | A1* | 5/2012 | Johnson | G09G 3/3426 345/596 |
| 2012/0194099 | A1* | 8/2012 | White | G09G 3/3208 315/307 |
| 2012/0287143 | A1* | 11/2012 | Brown Elliott | G09G 3/3413 345/589 |
| 2014/0340434 | A1* | 11/2014 | El-Ghoroury | G09G 3/3413 345/88 |
| 2016/0118020 | A1* | 4/2016 | Buckley | G09G 3/2022 345/597 |
| 2016/0381254 | A1 | 12/2016 | Poree | |
| 2017/0116955 | A1 | 4/2017 | Stauder | |
| 2020/0105179 | A1* | 4/2020 | Greenebaum | G09G 3/2051 |
| 2022/0323785 | A1* | 10/2022 | Petluri | G09G 3/342 |

FOREIGN PATENT DOCUMENTS

| | | | |
|---|---|---|---|
| CN | 108399901 | A | 8/2018 |
| CN | 110377391 | A | 10/2019 |
| JP | 2000155548 | A | 6/2000 |
| JP | 2017072754 | A | 4/2017 |
| TW | 480879 | B | 3/2002 |
| TW | 1416454 | B | 11/2013 |
| WO | 2006069117 | A2 | 6/2006 |

OTHER PUBLICATIONS

International Search Report and Written Opinion in International Patent Application No. PCT/CN2022/090182, dated Jun. 30, 2022, in 11 pages.

* cited by examiner

METHODS FOR COMPENSATING COLORS BASED ON LUMINANCE ADJUSTMENT PARAMETERS AND THE RELATED DISPLAY DEVICES

FIELD OF THE INVENTION

The present invention relates to a method of controlling or operating a display, and more particularly, to a method of compensation of a display.

BACKGROUND

A liquid crystal display (LCD) mainly includes a backlight at its rear side and a liquid crystal module at its front side. An image of the LCD is displayed by allowing the light emitted from the backlight to pass through several color filters disposed in front of the backlight to thereby generate three primary colors of red, green and blue at corresponding liquid-crystal valves disposed in the liquid crystal module, followed by using electrical signals to control the voltage between the electrodes disposed at two sides of respective liquid-crystal valves to thereby alter the light transmission ratio across the liquid crystals interposed between the electrodes. For illustrative purposes, a liquid-crystal valve is herein called a sub-cell. The red, green and blue light beams passing through the respective three sub-cells are mixed to constitute a color pixel. An entire picture is a combination of the brightness and chromaticity presented at respective pixel locations.

There are two ways of using LEDs as a backlight source: one is integrating a blue light LED with a phosphor powder, wherein the phosphor powder is excited to convert the blue light into a light having a longer wavelength so as to synthesize white light for illumination; the other is directly combining RGB LED chips to constitute a white light LED. However, regardless of the types of white light LEDs, the brightness and chromaticity values always vary from one LED die to another. For example, in the case of a white light LED integrating a blue light chip with a phosphor powder, the brightness and chromaticity of white light emitted from the LED will be affected by factors such as the wavelength of the blue light and the composition and mixture condition of the phosphor powder. As such, in the same batch of products, some LEDs may emit yellowish white light while others produce bluish white light, causing the light emitted from LED products to migrate within a range between 0.26 and 0.36 as defined by the Chromaticity Coordinates.

Similarly, in the case of a white light LED device that combines RGB LED chips, the mixed white light emitted therefrom varies as measured by the Chromaticity Coordinates system due to the diversity in chromaticity of respective LED dies.

As the brightness and chromaticity vary from one light source to another, the backlight may still fail to provide uniform emanating light even if a diffuser is placed in the light path. It is assumed that the i-th cell in a liquid crystal module has a primary backlight source of LED; and the i+1-th cell has a primary backlight source of $LED_{i+1}$. If $LED_i$ generates a reddish light and the $LED_{i+1}$ emits a bluish light, the pixel corresponding to the i-th cell may be reddish and the pixel corresponding to the i-th cell may be bluish when the display device displays a full white image. Hence, the overall brightness and chromaticity of the image shown on the display device are rendered non-uniform.

SUMMARY OF THE INVENTION

The present disclosure provides a method of selecting preferable virtual color coordinate points for compensating a non-uniform color display.

A screen of a display usually consists of a huge number of pixels. A pixel of a color display may emit lights of three primary colors and mixed lights composed of three primary colors. However, some display techniques may cause uneven colors. For example, the entire screen is expected to display a given primary color with the same brightness level, but the screen presents different colors at different regions. Once a given primary color cannot be uniformly displayed over the entire display screen, the displayed colors are distorted. This phenomenon is one of the main factors that causes the quality of an LED (light emitting diode) display to deteriorate. Optical and electrical characteristics of different LEDs are diverse, such that the color uniformity of the associated LED display may not be good. With a method of virtual primary colors, the foregoing problems of an LED color display may be solved. However, how to uniformly display primary colors with virtual primary colors is indeed a problem to be solved.

An embodiment of the present disclosure provides an electronic device comprising: a display comprising an array of pixels and a control circuit electrically connected to the display. Pixels in the array comprise a plurality of first sub-pixels defining a first color area in a chromaticity plane, a plurality of second sub-pixels defining a second color area in the chromaticity plane and a plurality of third sub-pixels defining a third color area in the chromaticity plane. The plurality of first sub-pixels is associated with a first primary color, the plurality of second sub-pixels is associated with a second primary color, and the plurality of third sub-pixels is associated with a third primary color. The control circuit is configured to receive an input image signal and generate a control signal to the display for driving each pixel of the display to output light in a virtual color gamut. The virtual color gamut of the display includes a first virtual color gamut including a first chromaticity coordinate point of the first primary color, a second virtual color gamut including a second chromaticity coordinate point of the second primary color, a third virtual color gamut including a third chromaticity coordinate point of the third primary color, and a fourth virtual color gamut. The fourth virtual color gamut is among the first, second and third color areas on the chromaticity plane and does not overlap any of the first, second or third color areas.

Another embodiment of the present disclosure provides a method of operating a display. The method comprises: receiving an input image signal for the display; and generating a control signal based on the input image signal and a compensation matrix to drive the display. The display includes an array of pixels. The display is configured to output light in a virtual color gamut according to the control signal. Pixels in the array comprise a plurality of first sub-pixels defining a first color area on a chromaticity plane, a plurality of second sub-pixels defining a second color area on the chromaticity plane, and a plurality of third sub-pixels defining a third color area on the chromaticity plane. The plurality of first sub-pixels is associated with a first primary color, the plurality of second sub-pixels is associated with a second primary color, and the plurality of third sub-pixels is associated with a third primary color. The virtual color gamut of the display includes a first virtual color gamut including a first chromaticity coordinate point of the first primary color, a second virtual color gamut including a second chromaticity coordinate point of the second primary color, a third virtual color gamut including a third chromaticity coordinate point of the third primary color, and a fourth virtual color gamut. The fourth virtual color gamut is among the first, second and third color areas on the chromaticity plane and does not overlap any of the first, second or third color areas.

A further embodiment of the present disclosure provides a method for compensating colors of a display. The display comprises an array of pixels. Pixels in the array comprise a plurality of first sub-pixels defining a first color area in a chromaticity plane, a plurality of second sub-pixels defining a second color area in the chromaticity plane, and a plurality of third sub-pixels defining a third color area in the chromaticity plane. The method comprises: determining a first chromaticity coordinate point of a first primary color associated with the plurality of first sub-pixels, a second chromaticity coordinate point of a second primary color associated with the plurality of second sub-pixels, and a third chromaticity coordinate point of a third primary color associated with the plurality of third sub-pixels; determining a compensation matrix for generating a control signal based on an input image signal; and determining at least a first luminance adjustment parameter, such that light on the first chromaticity coordinate point is emitted when a pixel is controlled to emit light of the first primary color. The control signal controls each pixel of the display to emit light in a virtual color gamut, wherein the virtual color gamut of the display is among the first, second and third color areas on the chromaticity plane and does not overlap any of the first, second or third color areas.

BRIEF DESCRIPTION OF THE DRAWINGS

In order to describe the manner in which advantages and features of the present disclosure can be obtained, a description of the present disclosure is rendered by reference to specific embodiments thereof, which are illustrated in the appended drawings. These drawings depict only example embodiments of the present disclosure and are not therefore to be considered limiting of its scope.

DETAILED DESCRIPTION

Figure 1A:
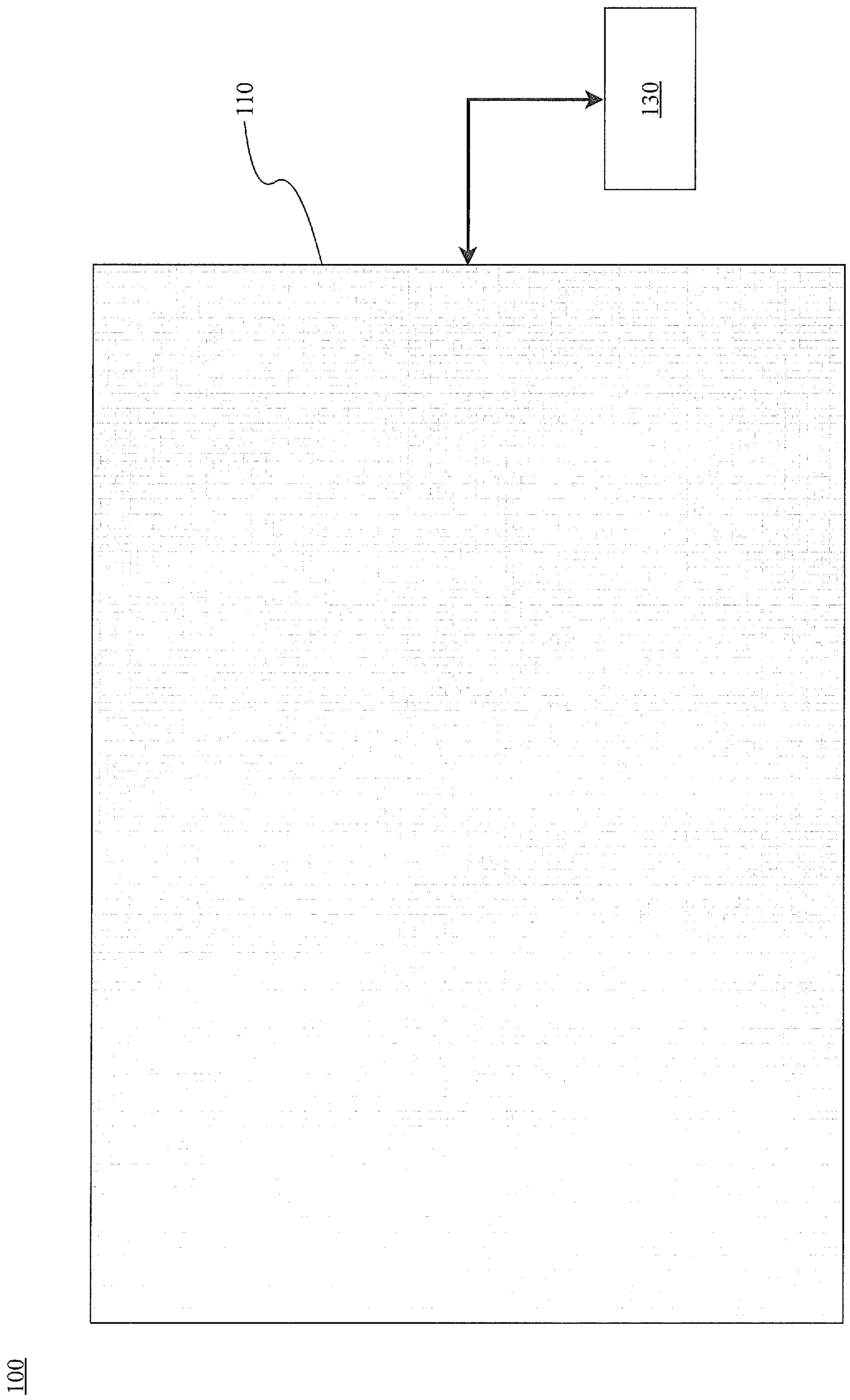
FIG. 1A illustrates a schematic diagram of an electronic display according to some embodiments of the present disclosure.

The following disclosure provides many different embodiments, or examples, for implementing different features of the provided subject matter. Specific examples of operations, components, and arrangements are described below to simplify the present disclosure. These are, of course, merely examples and are not intended to be limiting. For example, a first operation performed before or after a second operation in the description may include embodiments in which the first and second operations are performed together, and may also include embodiments in which additional operations may be performed between the first and second operations. For example, the formation of a first feature over, on or in a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Time relative terms, such as "prior to," "before," "posterior to," "after" and the like, may be used herein for ease of description to describe one operation or feature's relationship to another operation(s) or feature(s) as illustrated in the figures. The time relative terms are intended to encompass different sequences of the operations depicted in the figures. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Relative terms for connections, such as "connect,"

"connected," "connection," "couple," "coupled," "in communication," and the like, may be used herein for ease of description to describe an operational connection, coupling, or linking one between two elements or features. The relative terms for connections are intended to encompass different connections, coupling, or linking of the devices or components. The devices or components may be directly or indirectly connected, coupled, or linked to one another through, for example, another set of components. The devices or components may be wired and/or wireless connected, coupled, or linked with each other.

As used herein, the singular terms "a," "an," and "the" may include plural referents unless the context clearly indicates otherwise. For example, reference to a device may include multiple devices unless the context clearly indicates otherwise. The terms "comprising" and "including" may indicate the existences of the described features, integers, steps, operations, elements, and/or components, but may not exclude the existences of combinations of one or more of the features, integers, steps, operations, elements, and/or components. The term "and/or" may include any or all combinations of one or more listed items.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

The nature and use of the embodiments are discussed in detail as follows. It should be appreciated, however, that the present disclosure provides many applicable inventive concepts that can be embodied in a wide variety of specific contexts. The specific embodiments discussed are merely illustrative of specific ways to embody and use the disclosure, without limiting the scope thereof.

FIG. 1A illustrates a schematic diagram of an electronic display 100 according to some embodiments of the present disclosure. The electronic display 100 may include a display panel 110. The display panel 110 may be made of an array of color light emitting diodes (LEDs) or an array of organic light emitting diodes (OLEDs).

In some embodiments, the display panel 110 may be a liquid crystal panel, and a corresponding backlight module would be necessary. The backlight module may be a layer-shaped module disposed behind the liquid crystal panel. The backlight module can provide light passing though the liquid crystal panel. The backlight module may be arranged around the liquid crystal panel. The backlight module may be made of light emitting diodes or other suitable light sources.

The display panel 110 can be coupled, connected, or in communication with a control circuit 130. The control circuit 130 can control the display panel 110 and/or a backlight module. The control circuit 130 can be configured to receive an input image signal and generate a control signal to the display for driving each pixel of the display to output corresponding color lights.

Figure 1B:
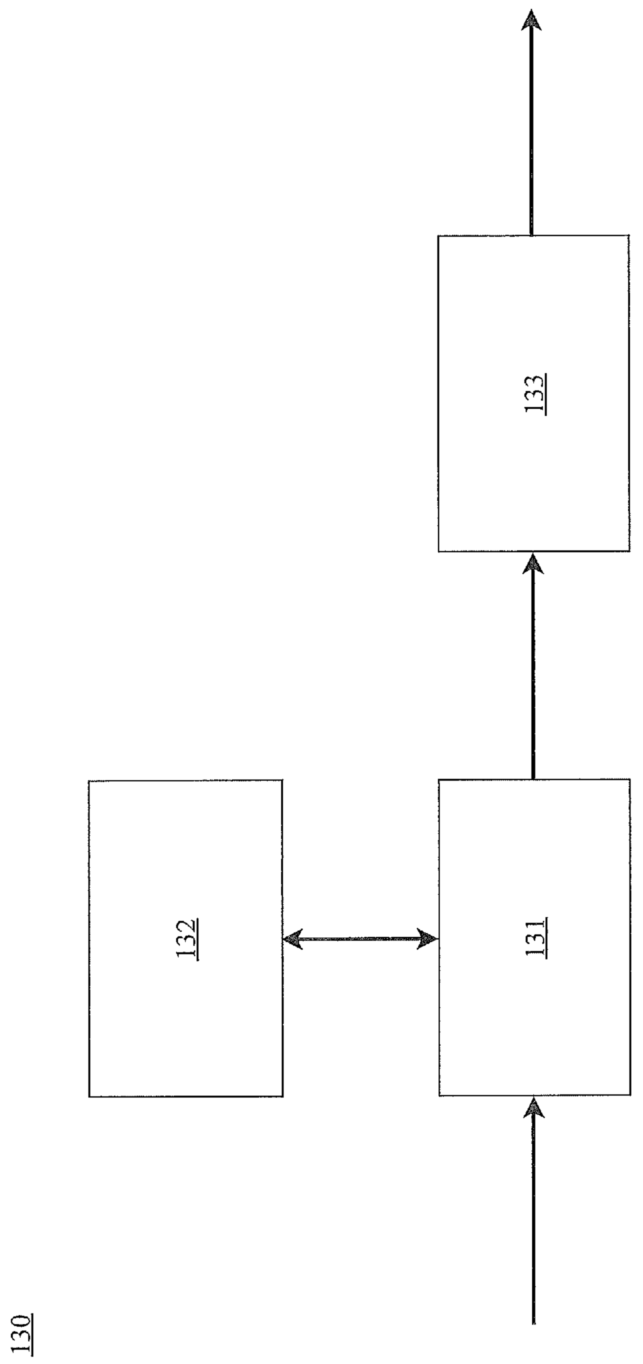
FIG. 1B illustrates a schematic diagram of a control circuit according to some embodiments of the present disclosure.

FIG. 1B illustrates a schematic diagram of the control circuit 130 according to some embodiments of the present disclosure. The control circuit 130 may include a processor 131, a storage device 132, and a display driver 133. Input image data to be displayed can be input to the processor 131. The processor 131 may transform the input image data into an output image data based on the transformation matrix (e.g., a compensation matrix) stored in the storage device 132. The display driver 133 may receive the output image data from the processor 131. The display driver 133 may generate control signals based on the received output image data and output the control signals to the liquid crystal panel 110 and the backlight module 120.

The electronic display 100 or the liquid crystal panel 110 may include an array of pixels. Each pixel may include a set of a plurality of sub-pixels. For example, each pixel of a display may include a set of red, green, and blue (R, G, B) sub-pixels, a set of red, green, blue, and yellow (R, G, B, Y) sub-pixels, or a set of red, green, blue, and white (R, G, B, W) sub-pixels.

Figure 2A:
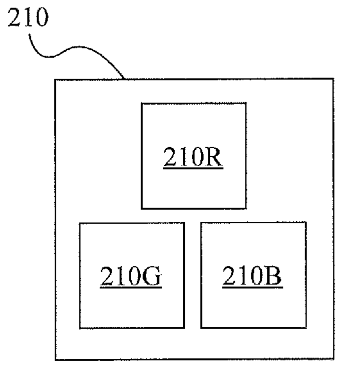
FIGS. 2A-2D illustrate schematic diagrams of different sub-pixel arrangements according to some embodiments of the present disclosure.
Figure 2B:
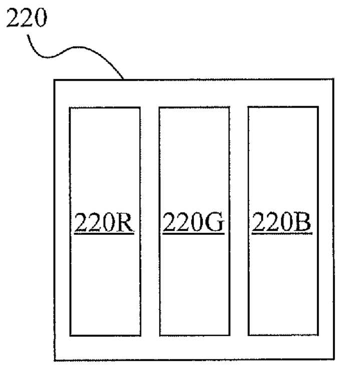

FIGS. 2A-2D illustrate schematic diagrams of different sub-pixel arrangements in one pixel. FIG. 2A illustrates an exemplary pixel 210. The pixel 210 may include sub-pixels 210R, 210G, and 210B, which indicate red, blue, and green sub-pixels. The sub-pixels 210R, 210G, and 210B can emit red light, green light, and blue light, respectively. FIG. 2B illustrates an exemplary pixel 220. The pixel 220 may include vertically arranged sub-pixels 220R, 220G, and 220B, which indicate red, blue, and green sub-pixels. The sub-pixels 220R, 220G, and 220B can emit red light, green light, and blue light, respectively.

Figure 2C:
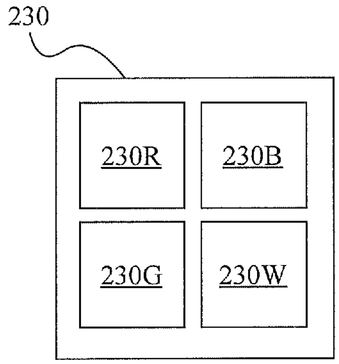
Figure 2D:
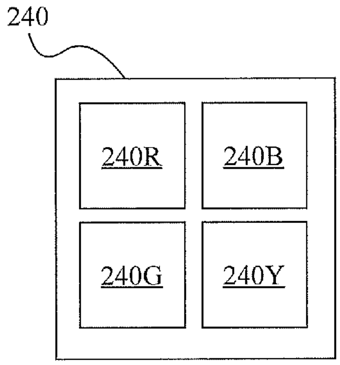

FIG. 2C illustrates an exemplary pixel 230. The pixel 230 may include sub-pixels 230R, 230G, 230B, and 230W, which indicate red, blue, green, and white sub-pixels. The sub-pixels 230R, 230G, 230B, and 230W can emit red light, green light, blue light, and white light, respectively. FIG. 2D illustrates an exemplary pixel 240. The pixel 240 may include sub-pixels 240R, 240G, 240B, and 240Y, which indicate red, blue, green, and yellow sub-pixels. The sub-pixels 240R, 240G, 240B, and 240Y can emit red light, green light, blue light, and yellow light, respectively.

As shown in FIGS. 2A-2D, each pixel of a display may include a plurality of monochrome elements (or sub-pixels). The lights of the plurality of monochrome elements (or sub-pixels) may be mixed to display different colors and brightness levels.

The chromaticity levels of the monochrome elements of different pixels over the entire screen may not be consistent. The case of non-uniform chromaticity levels may be caused when displaying the same monochrome or the same mixed color over the entire screen. In order to solve this problem, the techniques of virtual color coordinate points may be used. In the techniques of virtual color coordinate points, other monochrome elements can assist to compensate when a monochrome is displayed such that the chromaticity levels of the pixels over the entire screen are consistent.

In some embodiments, assuming that the saturation of the raw red color of a given pixel is much higher than other pixels, green color and blue color may be used to assist compensation when the given pixel is going to present the primary red color such that the given pixel eventually is presented as a pixel having lower saturation of red color. In this way, when the given pixel presents the primary red color, the chromaticity level of the primary red color of the given pixel is close to those of the primary red of other pixels such that the color of the entire screen is consistent and even.

Figure 3A:
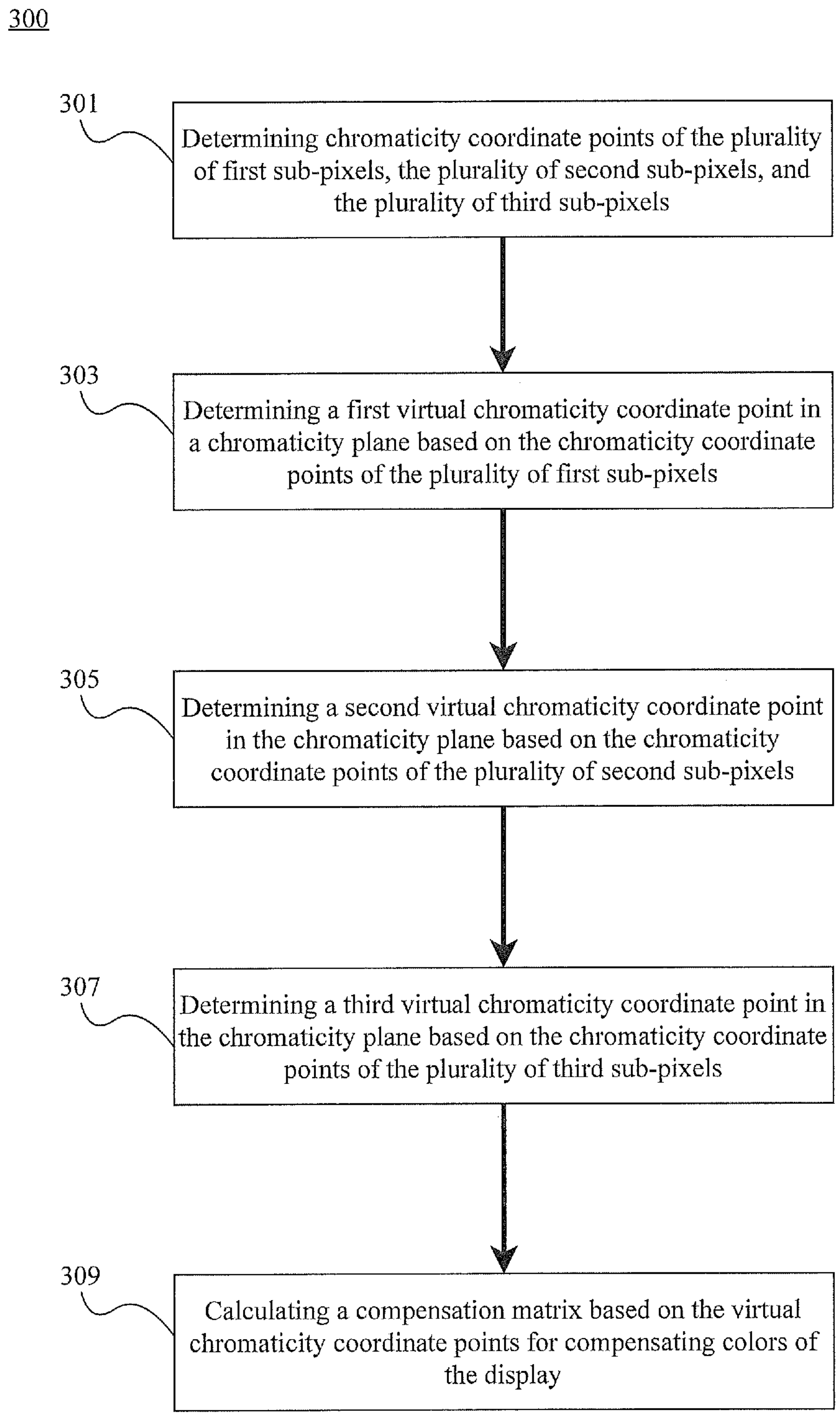
FIG. 3A illustrates a flow chart of a method of compensating colors of a display according to some embodiments of the present disclosure.

FIG. 3A discloses a method 300 of compensating colors of a display according to some embodiments of the present disclosure. The method 300 may be used for the display 100 comprising an array of pixels. The method 300 may include operations for obtaining and analyzing chromaticity data and brightness data and determining preferable virtual color coordinate points. The method 300 may be performed by a computing device. The computing device may receive data from a sensor which can measure or obtain chromaticity data and brightness data of the pixels of the display 100. In the display 100, the pixels in the array may comprise a plurality of first sub-pixels, a plurality of second sub-pixels, and a plurality of third sub-pixels. In some embodiments, the pixels in the array may comprise a plurality of red sub-pixels, a plurality of green sub-pixels, and a plurality of blue sub-pixels. The pixels in the array may comprise a plurality of red sub-pixels, a plurality of green sub-pixels, a plurality of blue sub-pixels, and a plurality of white sub-pixels. The pixels in the array may comprise a plurality of red sub-pixels, a plurality of green sub-pixels, a plurality of blue sub-pixels, and a plurality of yellow sub-pixels.

The method 300 may include operation 301. In operation 301, chromaticity coordinate points of the plurality of first sub-pixels, the plurality of second sub-pixels, and the plurality of third sub-pixels may be determined. One chromaticity coordinate point of one first sub-pixels may be determined by measuring the X, Y, and Z tristimulus values of the first sub-pixel while it is lit. One chromaticity coordinate point of one second sub-pixels may be determined by measuring the X, Y, and Z tristimulus values of the second sub-pixel while it is lit. One chromaticity coordinate point of one third sub-pixels may be determined by measuring the X, Y, and Z tristimulus values of the third sub-pixel while it is lit. A plurality of first sub-pixels can define a first color area on a chromaticity plane. A plurality of second sub-pixels can define a second color area on the chromaticity plane. A plurality of third sub-pixels can define a third color area on the chromaticity plane.

The method 300 may further include operations 303, 305, and 307. In operation 303, a first virtual chromaticity coordinate point on a chromaticity plane is determined based on the chromaticity coordinate points of the plurality of first sub-pixels. In operation 305, a second virtual chromaticity coordinate point on the chromaticity plane is determined based on the chromaticity coordinate points of the plurality of second sub-pixels. In operation 307, a third virtual chromaticity coordinate point on the chromaticity plane is determined based on the chromaticity coordinate points of the plurality of third sub-pixels. The first, second, and third virtual chromaticity coordinate points may form a virtual color gamut for the display 100. The first, second, and third virtual chromaticity coordinate points may indicate three primary colors in the virtual color gamut for the display 100.

The method 300 includes operation 309. In operation 309, based on the three or more virtual chromaticity coordinate points, a compensation matrix can be calculated to compensate colors of the display 100. In some embodiments, based on the three or more virtual chromaticity coordinate points, a compensation matrix for each pixel of the display 100 can be calculated to compensate colors. Based on the three or more virtual chromaticity coordinate points, a compensation matrix for each sub-pixel of each pixel of the display 100 can be calculated to compensate colors.

Figure 3B:
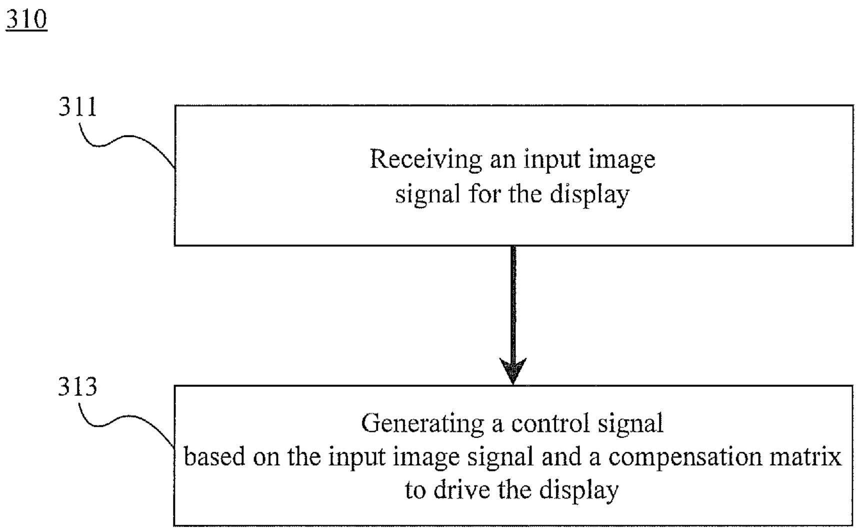
FIG. 3B illustrates a flow chart of a method of compensating colors of a display according to some embodiments of the present disclosure.

FIG. 3B disclose a method 310 of compensating colors of a display according to some embodiments of the present disclosure. The method 310 may include operations 311 and 313.

Referring to FIG. 1B, the compensation matrix may be stored in the storage device 132. In operation 311, an input image signal for the display may be received. Referring to FIG. 1B again, input image data (e.g., including an input image signal) to be displayed can be input to the processor 131 of the display 100.

In operation 313, a control signal to drive the display may be generated based on the input image signal and a compensation matrix. Referring to FIG. 1B again, the processor 131 may transform the input image data (e.g., including an input image signal) into an output image data based on one or more compensation matrixes stored in the storage device 132. The input image data may include input values, and each input value may be for one pixel. The processor 131 may transform each input value in the input image data into the corresponding output value based on one or more compensation matrixes stored in the storage device 132, combine the corresponding output values into an output image data, and then output the output image data. The display driver 133 may receive the output image data from the processor 131. The display driver 133 may generate control signals for driving pixels of the display panel 110 based on the output values in the received output image data. The display driver 133 may output the control signals to the pixels of the display panel 110 so as to make the pixels emit corresponding color lights based on the control signals.

Figure 3C:
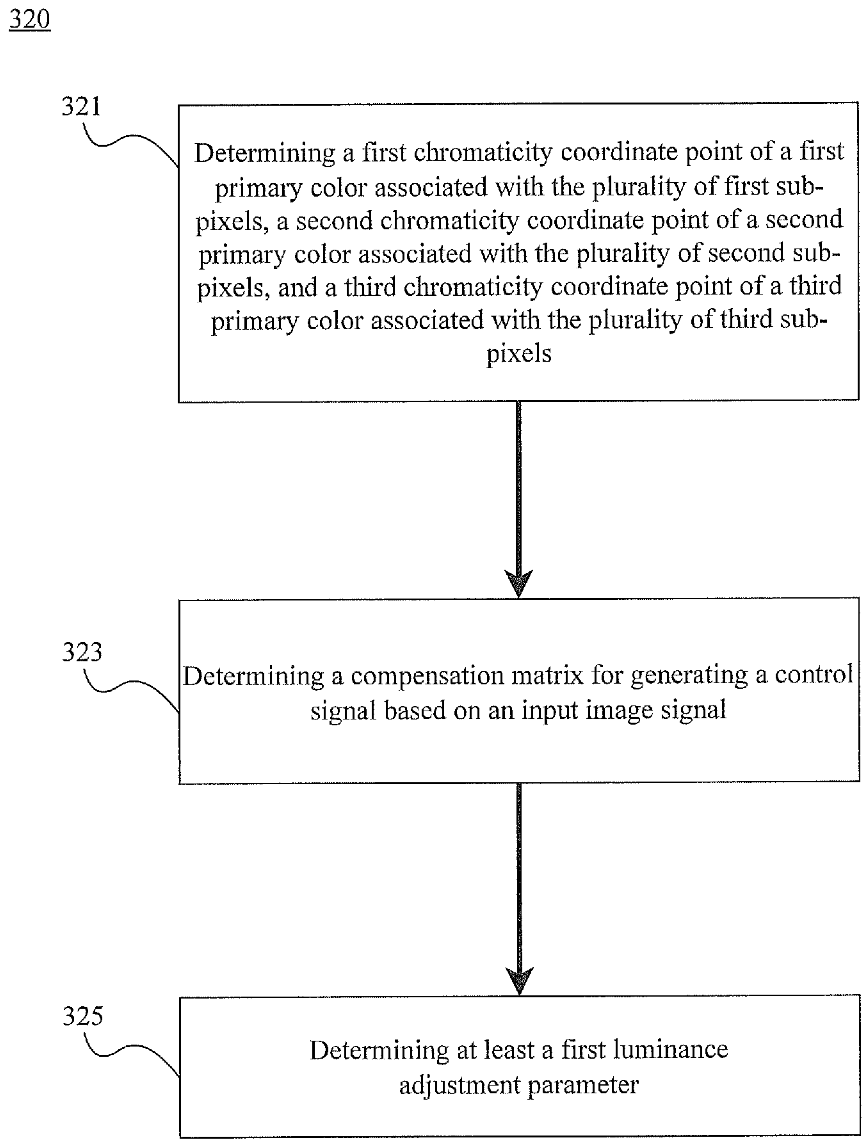
FIG. 3C illustrates a flow chart of a method of compensating colors of a display according to some embodiments of the present disclosure.

FIG. 3C discloses a method 320 of compensating colors of a display according to some embodiments of the present disclosure. The method 320 may be used for the display 100 comprising an array of pixels. The method 320 may include operations for obtaining and analyzing chromaticity data and brightness data and determining preferable virtual color coordinate points. The method 320 may be performed by a computing device. The computing device may receive data from a sensor which can measure or obtain chromaticity data and brightness data of the pixels of the display 100. In the display 100, the pixels in the array may comprise a plurality of first sub-pixels, a plurality of second sub-pixels, and a plurality of third sub-pixels. A plurality of first sub-pixels can define a first color area on a chromaticity plane. A plurality of second sub-pixels can define a second color area on the chromaticity plane. A plurality of third sub-pixels can define a third color area on the chromaticity plane.

In some embodiments, the pixels in the array may comprise a plurality of red sub-pixels, a plurality of green sub-pixels, and a plurality of blue sub-pixels. The pixels in the array may comprise a plurality of red sub-pixels, a plurality of green sub-pixels, a plurality of blue sub-pixels, and a plurality of white sub-pixels. The pixels in the array may comprise a plurality of red sub-pixels, a plurality of green sub-pixels, a plurality of blue sub-pixels, and a plurality of yellow sub-pixels.

The method 320 may include operation 321. In operation 321, a first chromaticity coordinate point of a first primary color associated with the plurality of first sub-pixels is determined. A second chromaticity coordinate point of a second primary color associated with the plurality of second sub-pixels is determined. A third chromaticity coordinate point of a third primary color associated with the plurality of third sub-pixels is determined. The first chromaticity coordinate point of the first primary color may be determined by measuring the X, Y, and Z tristimulus values of the first sub-pixels while they are lit. The second chromaticity coordinate point of the second primary color may be determined by measuring the X, Y, and Z tristimulus values of the second sub-pixels while they are lit. The third chromaticity coordinate point of the third primary color may be determined by measuring the X, Y, and Z tristimulus values of the third sub-pixels while they are lit.

The method 320 may further include operations 323. In operation 323, a compensation matrix for generating a control signal based on the input image signal is determined. The control signal may control each pixel of the display 100 to emit light in a virtual color gamut. The virtual color gamut of the display 100 is among the first, second, and third color areas on the chromaticity plane and does not overlap any of the first, second, or third color areas.

The method 320 may further include operations 325. In operation 325, at least a first luminance adjustment parameter is determined. When the first luminance adjustment parameter is applied to the compensation matrix, if a pixel is controlled to emit light of the first primary color, light on the first chromaticity coordinate point would be emitted.

The method 320 may further include determining at least a second luminance adjustment parameter. When the second luminance adjustment parameter is applied to the compensation matrix, if a pixel is controlled to emit light of the second primary color, light on the second chromaticity coordinate point would be emitted.

The method 320 may further include determining at least a third luminance adjustment parameter. When the third luminance adjustment parameter is applied to the compensation matrix, if a pixel is controlled to emit light of the third primary color, light on the third chromaticity coordinate point would be emitted.

Figure 4:
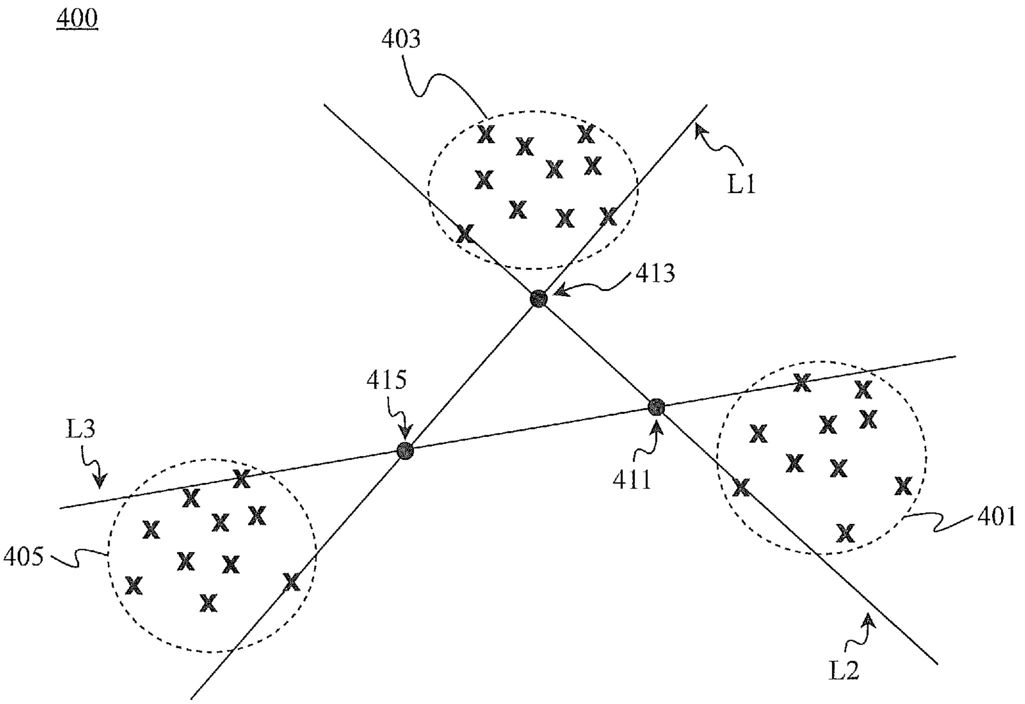
FIG. 4 illustrates a schematic diagram of a chromaticity plane according to some embodiments of the present disclosure.

FIG. 4 illustrates a schematic diagram of a chromaticity plane 400 according to some embodiments of the present disclosure. The chromaticity plane 400 may be a CIE 1931 color space. The chromaticity plane 400 may be included in a CIE 1931 color space. The chromaticity plane 400 may be a projected plane of a CIE 1931 color space.

The cross marks on the chromaticity plane 400 are defined by the sub-pixels of the electronic display 100 according to some embodiments of the present disclosure. The cross marks may be indicated by an x value and a y value on the chromaticity plane 400. The cross marks may be indicated by an x value, a y value, and a luminance value on the chromaticity plane 400. Each cross mark on the chromaticity plane 400 may be determined by measuring the X, Y, and Z tristimulus values of one sub-pixel while it is lit.

The cross marks may be may be divided into multiple groups. In FIG. 4, the cross marks are divided into three groups: 401, 403, and 405. The groups 401, 403, and 405 may thus define three color areas on the chromaticity plane 400. In some embodiments, the three color areas defined by the groups 401, 403, and 405 may belong to red color, green color, and blue color, respectively. The cross marks in the group 401 may be the chromaticity coordinate points of the red sub-pixels. The cross marks in the group 403 may be the chromaticity coordinate points of the green sub-pixels. The cross marks in the group 405 may be the chromaticity coordinate points of the blue sub-pixels.

In some embodiments, based on analyses of the chromaticity coordinate points for three sub-pixels, the three color areas for three sub-pixels may be represented as ($x_1$, $y_1$, $V_1$, $L_{1min}$), ($x_2$, $y_2$, $V_2$, $L_{2min}$), and ($x_3$, $y_3$, $V_3$, $L_{3min}$), where ($x_1$, $y_1$), ($x_2$, $y_2$), and ($x_3$, $y_3$) respectively indicate the center point of the three color areas, $V_1$, $V_2$ and $V_3$ respectively indicate the radii (or variations) of the three color areas, and $L_{1min}$, $L_{2min}$, and $L_{3min}$ respectively indicate the minimum luminance levels (or brightness levels) in the three color areas. For example, based on analyses of the chromaticity coordinate points for red, green, and blue sub-pixels, the three color areas may be represented as ($x_r$, $y_r$, $V_r$, $L_{rmin}$), ($x_g$, $y_g$, $V_g$, $L_{gmin}$), and ($x_b$, $y_b$, $V_b$, $L_{bmin}$), where ($x_r$, $y_r$), ($x_g$, $y_g$), and ($x_b$, $y_b$) respectively indicate the center point of the three color areas, $V_r$, $V_g$, and $V_b$ respectively indicate the radii (or variations) of the three color areas, and $L_{rmin}$, $L_{gmin}$, and $L_{bmin}$ respectively indicate the minimum luminance levels (or brightness levels) in the three color areas.

From the cross marks in the groups 401, 403, and 405, it can be observed that the same sub-pixel of the pixels of the device 100 may not be emitting the same chromaticity levels and/or the same luminance levels. For example, the first sub-pixels of the pixels of the device 100 may not be emitting the same chromaticity levels and/or the same luminance levels, and cross marks in the group 401 are diverse from each other. In some embodiments, it can be observed that the red sub-pixels of the pixels of the device 100 may not be emitting the same chromaticity levels and/or brightness levels, and cross marks in the group 401 are diverse from each other.

In some further embodiments, each pixel of the electronic display 100 may include four sub-pixels. The cross marks defined by the four sub-pixels of the pixels may be divided into four groups on the chromaticity plane 400. The four groups may thus define four color areas on the chromaticity plane 400. In some embodiments, the four color areas defined by the groups may belong to red color, green color, blue color, and white color. The four color areas defined by the groups may belong to red color, green color, blue color, and yellow color.

In some embodiments, three virtual chromaticity coordinate points may be determined based on the groups 401, 403, and 405 in FIG. 4. The groups 401, 403, and 405 may thus define three color areas on the chromaticity plane 400, and three virtual chromaticity coordinate points may be determined based on the three color areas. An exemplary embodiment of the three virtual chromaticity coordinate points may be points 411, 413, and 415. The points 411, 413, and 415 may form a virtual color gamut for the display 100 on the chromaticity plane 400. The points 411, 413, and 415 may indicate three primary colors in the virtual color gamut for the display 100.

In some further embodiments, when each pixel of the electronic display 100 includes four sub-pixels, four virtual chromaticity coordinate points may be determined based on the corresponding four groups on the chromaticity plane 400. When each pixel of the electronic display 100 includes four sub-pixels, the corresponding four groups on the chromaticity plane 400 may define four color areas on the chromaticity plane 400, and four virtual chromaticity coordinate points may be determined based on the four color areas.

According to some embodiments, the points 411, 413, and 415 in FIG. 4 may be defined as the three vertexes of a triangle. The triangle defining the points 411, 413, and 415 in FIG. 4 may be determined by lines L1, L2, and L3.

Taking FIG. 4 as an exemplary embodiment, the line L1 may be determined such that the groups 403 and 405 are on one side of the line L1 and the group 401 is on the other side of the line L1. For example, the line L1 is determined such that the groups 403 and 405 are on the left side of the line L1 and the group 401 is on the right side of the line L1. In some embodiments, the line L1 may be determined by one cross mark in the group 403 and one cross mark in the group 405 such that the other cross marks in the groups 403 and 405 are on one side of the line L1 and the group 401 is on the other side of the line L1.

The line L2 may be determined such that the groups 401 and 403 are on one side of the line L2 and the group 405 is on the other side of the line L2. For example, the line L2 is determined such that the groups 401 and 403 are on the right side of the line L2 and the group 405 is on the left side of the line L2. In some embodiments, the line L2 may be determined by one cross mark in the group 401 and one cross mark in the group 403 such that the other cross marks in the groups 401 and 403 are on one side of the line L2 and the group 405 is on the other side of the line L2.

The line L3 may be determined such that the groups 401 and 405 are on one side of the line L3 and the group 403 is on the other side of the line L3. For example, the line L3 is determined such that the groups 401 and 405 are on the lower side of the line L3 and the group 403 is on the upper side of the line L3. In some embodiments, the line L3 may be determined by one cross mark in the group 401 and one cross mark in the group 405 such that the other cross marks in the groups 401 and 405 are on one side of the line L3 and the group 403 is on the other side of the line L3.

As shown FIG. 4, upon determining the lines L1, L2, and L3 a corresponding triangle can be defined. The lines L1, L2, and L3 can be the three sides (or edges) of the triangle. The points 411, 413, and 415 can be the three vertexes of the triangle defined by the lines L1, L2, and L3. In some embodiments, the points 411, 413, and 415 can be the three intersection points of the lines L1, L2, and L3.

Figure 5:
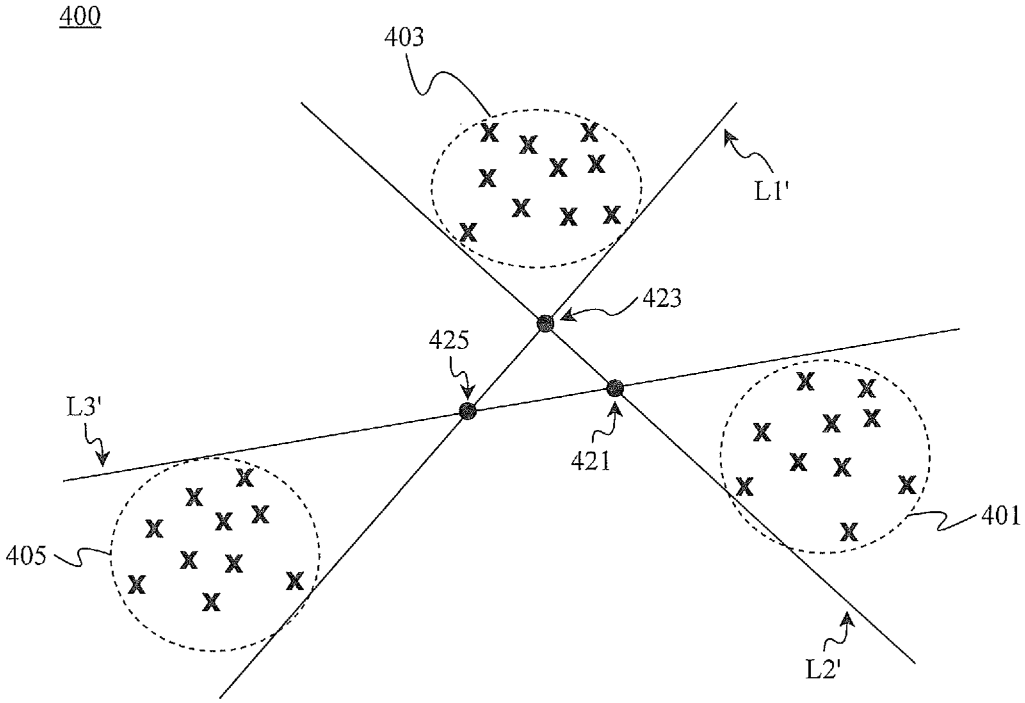
FIG. 5 illustrates a schematic diagram of a chromaticity plane according to some embodiments of the present disclosure.

FIG. 5 illustrates a schematic diagram of a chromaticity plane 400 according to some embodiments of the present disclosure. In FIG. 5, the lines L1, L2, and L3 are moved inwardly to form lines L1', L2', and L3'. The triangle defined by the lines L1', L2', and L3' is smaller than that defined by the lines L1, L2, and L3. The three vertexes of the triangle defined by the lines L1', L2', and L3' are points 421, 423, and 425. The points 421, 423, and 425 are closer to each other than the points 411, 413, and 415 are.

In FIG. 4, the points 411, 413, and 415 are the virtual chromaticity coordinate points for the colors indicated by the groups 401, 403, and 405, respectively. For example, when the cross marks in the group 401, 403, and 405 respectively indicate the chromaticity coordinate points for red, green, and blue sub-pixels, the points 411, 413, and 415 are the virtual chromaticity coordinate points for red color, green color, and blue color, respectively. The points 411, 413, and 415 may form a virtual color gamut defined by the corresponding red color, green color, and blue color on the chromaticity plane 400. The points 411, 413, and 415 may indicate the red, green and blue primary colors in the virtual color gamut.

After the virtual chromaticity coordinate points (i.e., the points 411, 413, and 415 in FIG. 4) and the virtual color gamut are determined, the corresponding compensation matrixes for each pixel would be calculated or determined. Through the transformations according to the compensation matrixes, when the input image data indicates displaying the color of a sub-pixel at some given pixels, the given pixels would be instructed (e.g., by the control circuit 130 or the display driver 133) to display the color of the corresponding virtual chromaticity coordinate point. Through the transformations according to the compensation matrixes, when the input image data indicates displaying a color indicated by the group 401, 403, or 405 at some given pixels, the given pixels would be instructed (e.g., by the control circuit 130 or the display driver 133) to display the color indicated by the corresponding virtual chromaticity coordinate point (i.e., the point 411, 413, or 415 in FIG. 4).

For example, if the group 401 indicates the red color of the red sub-pixels, when the input image data indicates displaying the red color at some given pixels, the given pixels would be instructed (e.g., by the control circuit 130 or the display driver 133) to display the color indicated by the corresponding virtual chromaticity coordinate point (i.e., the point 411) through the transformations according to the compensation matrixes. If the group 403 indicates the green color of the green sub-pixels, when the input image data indicates displaying the green color at some given pixels, the given pixels would be instructed (e.g., by the control circuit 130 or the display driver 133) to display the color indicated by the corresponding virtual chromaticity coordinate point (i.e., the point 413) through the transformations according to the compensation matrixes. If the group 405 indicates the blue color of the blue sub-pixels, when the input image data indicates displaying the blue color at some given pixels, the given pixels would be instructed (e.g., by the control circuit 130 or the display driver 133) to display the color indicated by the corresponding virtual chromaticity coordinate point (i.e., the point 415) through the transformations according to the compensation matrixes. Additionally, through the transformation according to the compensation matrixes, when the input image data indicates displaying a given color at some given pixels, the given pixels would be instructed (e.g., by the control circuit 130 or the display driver 133) to display the corresponding color in the virtual color gamut. Therefore, the present disclosure can solve the problem of the uneven chromaticity levels and/or uneven luminance levels while displaying any one of the colors of the sub-pixels (e.g., red sub-pixel, green sub-pixel, and blue sub-pixel).

In FIG. 5, the points 421, 423, and 425 are the virtual chromaticity coordinate points for the colors indicated by the groups 401, 403, and 405, respectively. For example, when the cross marks in the group 401, 403, and 405 respectively indicate the chromaticity coordinate points for red, green, and blue sub-pixels, the points 421, 423, and 425 are the virtual chromaticity coordinate points for red color, green color, and blue color, respectively. The points 421, 423, and 425 may form a virtual color gamut defined by the corresponding red color, green color, and blue color on the chromaticity plane 400. The points 421, 423, and 425 may indicate the red, green and blue primary colors in the virtual color gamut.

After the virtual chromaticity coordinate points (i.e., the points 421, 423, and 425 in FIG. 5) and the virtual color gamut are determined, the corresponding compensation matrixes for each pixel would be calculated or determined. Through the transformations according to the compensation matrixes, when the input image data indicates displaying a color indicated by the group 401, 403, or 405 at some given pixels, the given pixels would be instructed (e.g., by the control circuit 130 or the display driver 133) to display the color indicated by the corresponding virtual chromaticity coordinate point (i.e., the point 421, 423, or 425 in FIG. 5). Additionally, through the transformations according to the compensation matrixes, when the input image data indicates displaying a given color at some given pixels, the given pixels would be instructed (e.g., by the control circuit 130 or the display driver 133) to display the corresponding color in the virtual color gamut.

In some embodiments, the fourth virtual chromaticity coordinate point for the fourth sub-pixel can be determined based on the methods of the present disclosure. The four virtual chromaticity coordinate points may form a virtual color gamut on the chromaticity plane 400. After the virtual chromaticity coordinate points (i.e., the points 411, 413, and 415 in FIG. 4) and the virtual color gamut are determined, the corresponding compensation matrixes for each pixel would be calculated or determined. When the input image data indicates displaying the color of the fourth sub-pixel (e.g., white sub-pixel or yellow sub-pixel) at some given pixels, the given pixels would be instructed (e.g., by the control circuit 130 or the display driver 133) to display the color indicated by the fourth virtual chromaticity coordinate point. Additionally, through the transformation according to the compensation matrixes, when the input image data indicates displaying a given color at some given pixels, the given pixels would be instructed (e.g., by the control circuit 130 or the display driver 133) to display the corresponding color in the virtual color gamut. Therefore, the present disclosure can further solve the problem of the uneven chromaticity levels and/or uneven luminance levels while displaying the color of the fourth sub-pixels (e.g., white sub-pixel or yellow sub-pixel).

Figure 6:
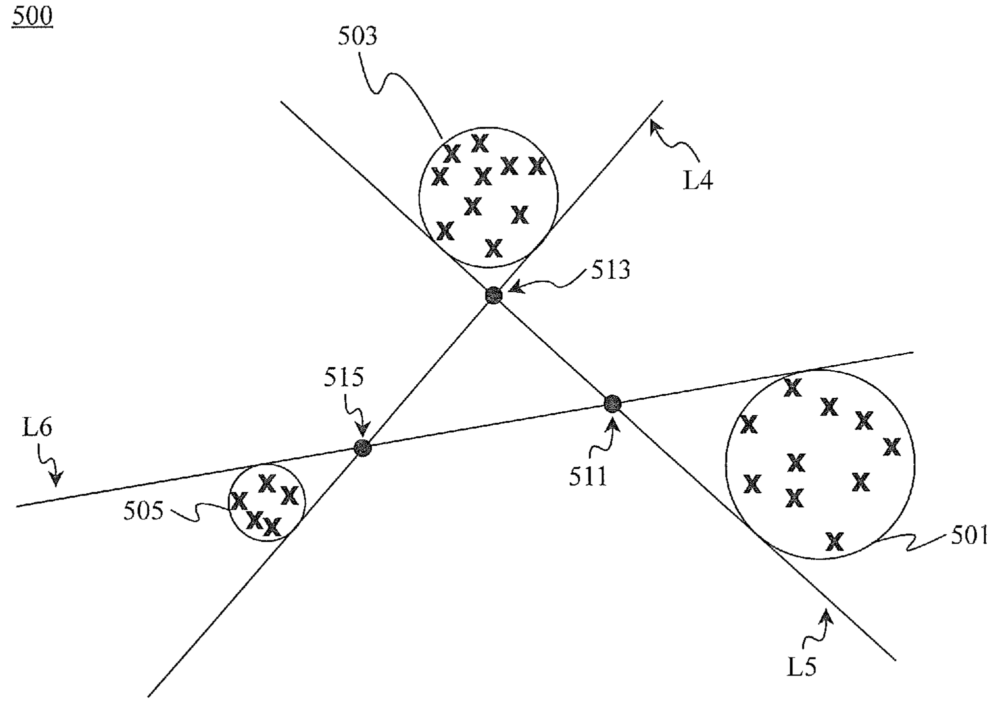
FIG. 6 illustrates a schematic diagram of a chromaticity plane according to some embodiments of the present disclosure.

FIG. 6 illustrates a schematic diagram of a chromaticity plane 500 according to some embodiments of the present disclosure. The chromaticity plane 500 may be a CIE 1931 color space. The chromaticity plane 500 may be included in a CIE 1931 color space. The chromaticity plane 500 may be a projected plane of a CIE 1931 color space.

The cross marks on the chromaticity plane 500 are defined by the sub-pixels of the electronic display 100 according to some embodiments of the present disclosure. The cross marks may be indicated by an x value and a y value on the chromaticity plane 500. The cross marks may be indicated by an x value, a y value, and a luminance value on the chromaticity plane 500. Each cross mark on the chromaticity plane 500 may be determined by measuring the X, Y, and Z tristimulus values of one sub-pixel while it is lit.

The cross marks may be may be divided into multiple groups. In FIG. 6, the three color areas 501, 503, and 505 may be determined by the cross marks. The three color areas 501, 503, and 505 may indicate red color, green color, and blue color, respectively. The cross marks in the color area 501 may be the chromaticity coordinate points of the red sub-pixels. The cross marks in the color area 503 may be the chromaticity coordinate points of the green sub-pixels. The cross marks in the color area 505 may be the chromaticity coordinate points of the blue sub-pixels.

The color areas 501, 503, and 505 may be circles. The color area 501 may be a circle including the chromaticity coordinate points of the corresponding sub-pixels (e.g., red sub-pixels). The color area 503 may be a circle including the chromaticity coordinate points of the corresponding sub-pixels (e.g., green sub-pixels). The color area 505 may be a circle including the chromaticity coordinate points of the corresponding sub-pixels (e.g., blue sub-pixels).

In some embodiments, the color areas 501, 503, and 505 may be represented as $(x_1, y_1, V_1)$, $(x_2, y_2, V_2)$, and $(x_3, y_3, V_3)$, where $(x_1, y_1)$, $(x_2, y_2)$, and $(x_3, y_3)$ respectively indicate the center point of the color areas 501, 503, and 505, $V_1$, $V_2$, and $V_3$ respectively indicate the radii (or variations) of the color areas 501, 503, and 505.

For example, if the color areas 501, 503, and 505 respectively indicate red color, green color, and blue color, the color areas 501, 503, and 505 may be represented $(x_r, y_r, V_r)$, $(x_g, y_g, V_g,)$, and $(x_b, y_b, V_b,)$, where $(x_r, y_r)$, $(x_g, y_g)$, and $(x_b, y_b)$ respectively indicate the center point of the color areas 501, 503, and 505, $V_r$, $V_g$, and $V_b$ respectively indicate the radii (or variations) of the color areas 501, 503, and 505.

In some embodiments, the color areas 501, 503, and 505 may be represented as $(x_1, y_1, V_1, L_{1min})$, $(x_2, y_2, V_2, L_{2min})$, and $(x_3, y_3, V_3, L_{3min})$, where $(x_1, y_1)$, $(x_2, y_2)$, and $(x_3, y_3)$ respectively indicate the center point of the three color areas, $V_1$, $V_2$, and $V_3$ respectively indicate the radii (or variations) of the three color areas, and $L_{1min}$, $L_{2min}$, and $L_{3min}$ respectively indicate the minimum luminance levels (or brightness levels) in the color areas 501, 503, and 505.

For example, if the color areas 501, 503, and 505 respectively indicate red color, green color, and blue color, the color areas 501, 503, and 505 may be represented $(x_r, y_r, V_r, L_{rmin})$, $(x_g, y_g, V_g, L_{gmin})$, and $(x_b, y_b, V_b, L_{bmin})$, where $(x_r, y_r)$, $(x_g, y_g)$, and $(x_b, y_b)$ respectively indicate the center point of the color areas 501, 503, and 505, $V_r$, $V_g$, and $V_b$ respectively indicate the radii (or variations) of the color areas 501, 503, and 505, and $L_{rmin}$, $L_{gmin}$, and $L_{bmin}$ respectively indicate the minimum luminance levels (or brightness levels) in the color areas 501, 503, and 505.

In some embodiments, the color areas 501, 503, and 505 may be defined by measuring the X, Y, and Z tristimulus values of different sub-pixels of all pixels of the display 100. In other embodiments, the color areas 501, 503, and 505 may be defined by factory specifications of different sub-pixels of all pixels of the display 100. Additionally, the specification of the LEDs in the display 100 may define the corresponding chromaticity coordinate points and illuminance ranges. For example, the specification of the LEDs may specify the values of x, y, and Y in a CIE xyY color space. The color areas 501, 503, and 505 may be obtained based on the values of x, y, and Yin a CIE xyY color space.

In some further embodiments, each pixel of the display 100 may include four sub-pixels. The cross marks defined by the four sub-pixels of the pixels may be divided into four groups on the chromaticity plane 500. The four groups may thus define four color areas on the chromaticity plane 500. In some embodiments, the four color areas defined by the groups may belong to red color, green color, blue color, and white color. The four color areas defined by the groups may belong to red color, green color, blue color, and yellow color.

In some embodiments, three virtual chromaticity coordinate points may be determined based on the color areas 501, 503, and 505 in FIG. 6. An exemplary embodiment of the three virtual chromaticity coordinate points may be points 511, 513, and 515. The points 511, 513, and 515 may form a virtual color gamut for the display 100 on the chromaticity plane 500. The points 511, 513, and 515 may indicate three primary colors in the virtual color gamut for the display 100. The virtual color gamut may be among the color areas 501, 503, and 505 on the chromaticity plane 500. The virtual color gamut may not overlap any of the color areas 501, 503, and 505.

In some further embodiments, when each pixel of the electronic display 100 includes four sub-pixels, four virtual chromaticity coordinate points may be determined based on the corresponding four color areas on the chromaticity plane 500.

According to some embodiments, the points 511, 513, and 515 in FIG. 6 may be defined as the three vertexes of a triangle. The triangle defining the points 511, 513, and 515 in FIG. 6 may be determined by lines L4, L5, and L6.

Taking FIG. 6 as an exemplary embodiment, the line L4 may be a common tangent line which is tangent to the color areas (e.g., circles) 503 and 505. The color areas 503 and 505 are on one side of the line L4 and the color area 501 is on the other side of the line L4. For example, the color areas 503 and 505 are on the left side of the line L4 and the color area 501 is on the right side of the line L1.

The line L5 may be a common tangent line which is tangent to the color areas (e.g., circles) 501 and 503. The color areas 501 and 503 are on one side of the line L5 and the color area 505 is on the other side of the line L5. For example, the color areas 501 and 503 are on the right side of the line L5 and the color area 505 is on the left side of the line L5.

The line L6 may be a common tangent line which is tangent to the color areas (e.g., circles) 501 and 505. The color areas 501 and 505 are on one side of the line L6 and the color area 503 is on the other side of the line L6. For example, the color areas 501 and 505 are on the lower side of the line L6 and the color area 503 is on the upper side of the line L6.

As shown FIG. 6, upon determining the lines L4, L5, and L6, a corresponding triangle can be defined. The lines L4, L5 and L6 can be the three sides (or edges) of the triangle. The points 511, 513, and 515 can be the three vertexes of the triangle defined by the lines L4, L5, and L6. In some embodiments, the points 511, 513, and 515 can be the three intersection points of the lines L4, L5, and L6.

Figure 7:
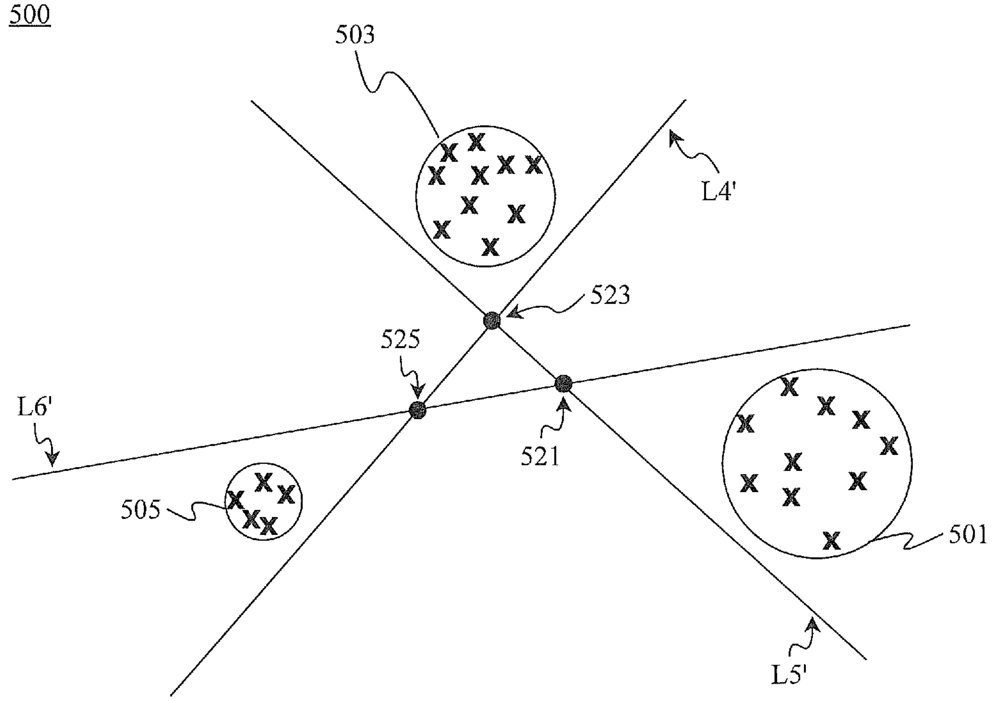
FIG. 7 illustrates a schematic diagram of a chromaticity plane according to some embodiments of the present disclosure.

FIG. 7 illustrates a schematic diagram of a chromaticity plane 500 according to some embodiments of the present disclosure. In FIG. 7, the lines L4, L5, and L6 are moved inwardly to form lines L4', L5', and L6'. The triangle defined by the lines L4', L5', and L6' is smaller than that defined by the lines L4, L5, and L6. The three vertexes of the triangle defined by the lines L4', L5', and L6' are points 521, 523, and 525. The points 521, 523, and 525 are closer to each other than the points 511, 513, and 515 are.

In FIG. 6, the points 511, 513, and 515 are the virtual chromaticity coordinate points for the colors indicated by the color areas 501, 503, and 505, respectively. For example, when the cross marks in the color areas 501, 503, and 505 respectively indicate the chromaticity coordinate points for red, green, and blue sub-pixels, the points 511, 513, and 515 are the virtual chromaticity coordinate points for red color, green color, and blue color, respectively. The points 511, 513, and 515 may form a virtual color gamut defined by the corresponding red color, green color, and blue color on the chromaticity plane 400. The points 511, 513 and 515 may indicate the red, green and blue primary colors in the virtual color gamut.

After the virtual chromaticity coordinate points (i.e., the points 511, 513, and 515 in FIG. 6) and the virtual color gamut are determined, the corresponding compensation matrixes for each pixel would be calculated or determined. Through the transformations according to the compensation matrixes, when the input image data indicates displaying the color of a sub-pixel at some given pixels, the given pixels would be instructed (e.g., by the control circuit 130 or the display driver 133) to display the color of the corresponding virtual chromaticity coordinate point. Through the transformations according to the compensation matrixes, when the input image data indicates displaying a color indicated by the color area 501, 503, or 505 at some given pixels, the given pixels would be instructed (e.g., by the control circuit 130 or the display driver 133) to display the color indicated by the corresponding virtual chromaticity coordinate point (i.e., the point 511, 513, or 515 in FIG. 6).

For example, if the color area 501 indicates the red color of the red sub-pixels, when the input image data indicates displaying the red color at some given pixels, the given pixels would be instructed (e.g., by the control circuit 130 or the display driver 133) to display the color indicated by the corresponding virtual chromaticity coordinate point (i.e., the point 511) through the transformations according to the compensation matrixes. If the color area 503 indicates the green color of the green sub-pixels, when the input image data indicates displaying the green color at some given pixels, the given pixels would be instructed (e.g., by the control circuit 130 or the display driver 133) to display the color indicated by the corresponding virtual chromaticity coordinate point (i.e., the point 513) through the transformations according to the compensation matrixes. If the color area 505 indicates the blue color of the blue sub-pixels, when the input image data indicates displaying the blue color at some given pixels, the given pixels would be instructed (e.g., by the control circuit 130 or the display driver 133) to display the color indicated by the corresponding virtual chromaticity coordinate point (i.e., the point 515) through the transformations according to the compensation matrixes. Additionally, through the transformation according to the compensation matrixes, when the input image data indicates displaying a given color at some given pixels, the given pixels would be instructed (e.g., by the control circuit 130 or the display driver 133) to display the corresponding color in the virtual color gamut. Therefore, the present disclosure can solve the problem of the uneven chromaticity levels and/or uneven luminance levels while displaying any one of the colors of the sub-pixels (e.g., red sub-pixel, green sub-pixel, and blue sub-pixel).

In FIG. 7, the points 521, 523, and 525 are the virtual chromaticity coordinate points for the colors indicated by the color areas 501, 503, and 505, respectively. For example, when the cross marks in the color areas 501, 503, and 505 respectively indicate the chromaticity coordinate points for red, green, and blue sub-pixels, the points 521, 523, and 525 are the virtual chromaticity coordinate points for red color, green color, and blue color, respectively. The points 521, 523, and 525 may form a virtual color gamut defined by the corresponding red color, green color, and blue color on the chromaticity plane 500. The points 521, 523, and 525 may indicate the red, green and blue primary colors in the virtual color gamut. The virtual color gamut may be among the color areas 501, 503, and 505 on the chromaticity plane 500. The virtual color gamut may not overlap any of the color areas 501, 503, and 505.

After the virtual chromaticity coordinate points (i.e., the points 521, 523, and 525 in FIG. 7) and the virtual color gamut are determined, the corresponding compensation matrixes for each pixel would be calculated or determined. Through the transformation according to the compensation matrixes, when the input image data indicates displaying a color indicated by the group 501, 503, or 505 at some given pixels, the given pixels would be instructed (e.g., by the control circuit 130 or the display driver 133) to display the color indicated by the corresponding virtual chromaticity coordinate point (i.e., the point 521, 523, or 525 in FIG. 7). Additionally, through the transformations according to the compensation matrixes, when the input image data indicates displaying a given color at some given pixels, the given pixels would be instructed (e.g., by the control circuit 130 or the display driver 133) to display the corresponding color in the virtual color gamut.

Equation (1) shows an exemplary compensation matrix M according to some embodiments of the present disclosure. Equation (1) may be associated with the embodiments of FIGS. 3A and 4-7. Equation (1) shows the relationship between an input value for a given pixel, a compensation matrix for the given pixel, and an output value for the given pixel. The input value may be included in input image data. The output value may be included in output image data. Equation (1) may be calculated or processed by the processor 131 of the control circuit 130. The compensation matrix M may be stored in the storage device 132 of the control circuit 130. Based on the output value for the given pixel, the corresponding control signal for the given pixel may be generated and output by the display driver 133 of the control circuit 130.

$$MI = S = \begin{bmatrix} M_{rr} & M_{gr} & M_{br} \\ M_{rg} & M_{gg} & M_{bg} \\ M_{rb} & M_{gb} & M_{bb} \end{bmatrix} \begin{bmatrix} R \\ G \\ B \end{bmatrix} = \begin{bmatrix} S_r \\ S_g \\ S_b \end{bmatrix} \quad \text{Equation (1)}$$

In Equation (1), the matrix I consisting of R, G, and B indicates the input value for a given pixel specified in the input image data. The matrix I consisting of R, G, and B includes red, green, and blue signal values for the red sub-pixel, the green sub-pixel, and the blue sub-pixel of the given pixel specified in the input image data. In particular, R indicates the red signal value for the red sub-pixel of the given pixel, G indicates the green signal value for the green sub-pixel of the given pixel, and B indicates the blue signal value for the blue sub-pixel of the given pixel.

In Equation (1), the matrix S consisting of $S_r$, $S_g$, and $S_b$ indicates the output value for a given pixel. The matrix S consisting of $S_r$, $S_g$, and $S_b$ includes red, green, and blue lighting signal values for the red sub-pixel, the green sub-pixel, and the blue sub-pixel of the given pixel. In particular, $S_r$ indicates the red lighting signal value for lighting the red sub-pixel of the given pixel of the display 100, $S_g$ indicates the green lighting signal value for lighting the green sub-pixel of the given pixel of the display 100, and $S_b$ indicates the blue lighting signal value for lighting the blue sub-pixel of the given pixel of the display 100. Based on $S_r$, $S_g$, and $S_b$ for the given pixel of the display 100, the corresponding control signals for the sub-pixels of the given pixel may be generated and output by the display driver 133 of the control circuit 130.

In Equation (1), the matrix M consisting of $M_{rr}$, $M_{rg}$, $M_{rb}$, $M_{gr}$, $M_{gg}$, $M_{gb}$, $M_{br}$, $M_{bg}$, and $M_{bb}$ indicates the compensation matrix for a given pixel. $M_{rr}$ indicates the amount of red lighting signal value (i.e., $S_r$) necessary for the red signal value (i.e., R). $M_{rg}$ indicates the amount of green lighting signal value (i.e., $S_g$) necessary for the red signal value (i.e., R). $M_{rb}$ indicates the amount of blue lighting signal value (i.e., $S_b$) necessary for the red signal value (i.e., R). $M_g$r indicates the amount of red lighting signal value (i.e., $S_r$) necessary for the green signal value (i.e., G). $M_{gg}$ indicates the amount of green lighting signal value (i.e., $S_g$) necessary for the green signal value (i.e., G). $M_g$b indicates the amount of blue lighting signal value (i.e., $S_b$) necessary for the green signal value (i.e., G). $M_{br}$ indicates the amount of red lighting signal value (i.e., $S_r$) necessary for the blue signal value (i.e., B). $M_{bg}$ indicates the amount of green lighting signal value (i.e., $S_g$) necessary for the blue signal value (i.e., B). $M_{bb}$ indicates the amount of blue lighting signal value (i.e., Sb) necessary for the blue signal value (i.e., B). After the virtual chromaticity coordinate points (e.g., the points 411, 413, and 415 in FIG. 4; the points 421, 423, and 425 in FIG. 5; the points 511, 513, and 515 in FIG. 6; or the points 521, 523, and 525 in FIG. 7) and the corresponding virtual color gamut are determined, the compensation matrixes M for each pixel can be calculated or determined.

In further embodiments, the present disclosure provides a method for processing the non-ideal virtual color gamut and the related display devices. In particular, the present disclosure provides a method of adjusting other auxiliary monochrome compensation values while displaying a monochrome in the virtual color coordinate techniques such that the loss of the color gamut is reduced.

Figure 8:
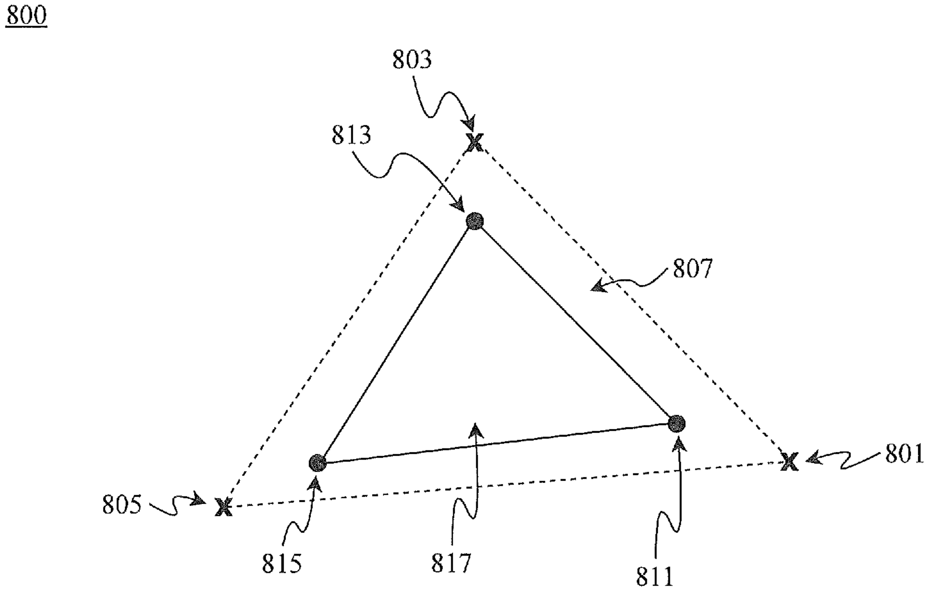
FIG. 8 illustrates a schematic diagram of a chromaticity plane according to some embodiments of the present disclosure.

FIG. 8 illustrates a schematic diagram of a chromaticity plane 800 according to some embodiments of the present disclosure. After applying the virtual color coordinate techniques as disclosed in the embodiments associated with FIGS. 3A and 4-7, the color area of the virtual color gamut would be smaller than that of the original color gamut. The method of adjusting other auxiliary monochrome compensation values may be applied to virtual color coordinate techniques other than those depicted in FIGS. 3A and 4-7, which provide uniform emanating light by reducing the area of the virtue color gamut.

Before applying the virtual color coordinate techniques, the display 100 may be able to display lights in the color gamut 807 defined by the three dashed lines. Three chromaticity coordinate points 801, 803, and 805 may be three primary colors, e.g., red, green, and blue. After applying the virtual color coordinate techniques, the display 100 can display lights in the virtual color gamut 817 defined by the three solid lines. The chromaticity coordinate points 811, 813, and 815 may indicate the three corresponding primary colors in the virtual color gamut 817. Therefore, the color range of the display 100 would be smaller after applying the virtual color coordinate techniques.

Furthermore, after applying the virtual color coordinate techniques, the displayed color may be unevenly mixed or unable to be mixed while displaying a monochrome or a primary color in the virtual color gamut 817 (e.g., displaying the color at one of vertex points 811, 813 and 815).

For example, if a pixel displays the red color at the vertex point 811, the red sub-pixel would contribute most of the illuminance, and little amounts of illuminance of the green and blue sub-pixels are mixed with the red light to display the red color with a lower saturation. However, the green and blue lights cannot be evenly mixed with red light because the amounts of green and blue lights are too low relative to the red light. When observed by the human eye, if red monochrome is to be displayed, little amounts of green and blue light may presented instead.

Figure 9A:
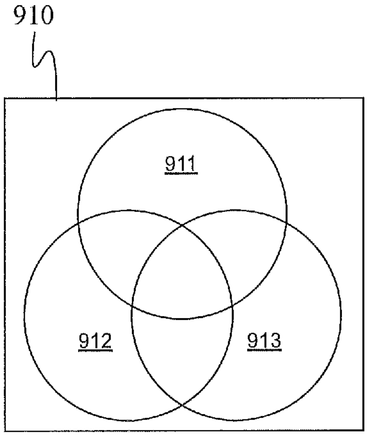
FIGS. 9A and 9B illustrates a schematic diagram of lights from sub-pixels according to some embodiments of the present disclosure.

FIG. 9A illustrates a schematic diagram of lights 911, 912, and 913 from sub-pixels of a pixel 910 according to some embodiments of the present disclosure. The lights 911, 912, and 913 may be red light, green light, and blue light. In theory, the lights from the three sub-pixels (e.g., red, green, and blue sub-pixels) can be evenly mixed in one pixel. However, the lights from the red, green, and blue sub-pixels are evenly mixed only if the amounts of red, green, and blue lights are approximate. FIG. 9A illustrates an example that the amounts of red, green, and blue lights are approximate.

Figure 9B:
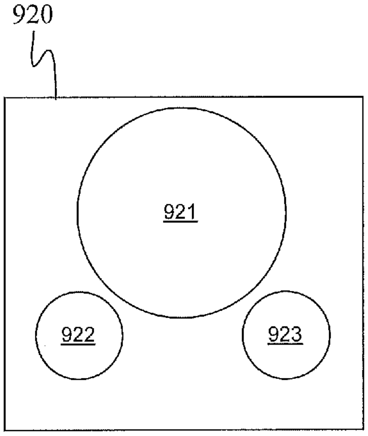

FIG. 9B illustrates a schematic diagram of lights 921, 922, and 923 from sub-pixels of a pixel 920 according to some embodiments of the present disclosure. The lights 921, 922, and 923 may be red light, green light, and blue light. If the amounts of green light and blue light are too low relative to the red light, the lights may not be sufficiently mixed, and two tiny points of green light and blue light may be seen instead. FIG. 9B illustrates an example wherein the amounts of green light and blue light are too low relative to the red light.

To overcome the problem of an insufficient mixture of lights, when a given monochrome (or primary color) in the virtual color gamut is displayed, the compensations from the lights of other monochromes (or sub-pixels) can be cancelled or lowered. In this way, the given monochrome (or primary color) to be displayed would be more saturated. The sub-pixels for a monochrome (or a primary color) in the pixels of the display 100 may not even present chromaticity over the entire screen. However, while displaying a given monochrome (or primary color), the chromaticity is deep (or high) and the saturation is high, and human eyes thus actually do not easily notice the uneven chromaticity over the screen of the display 100.

Figure 10:
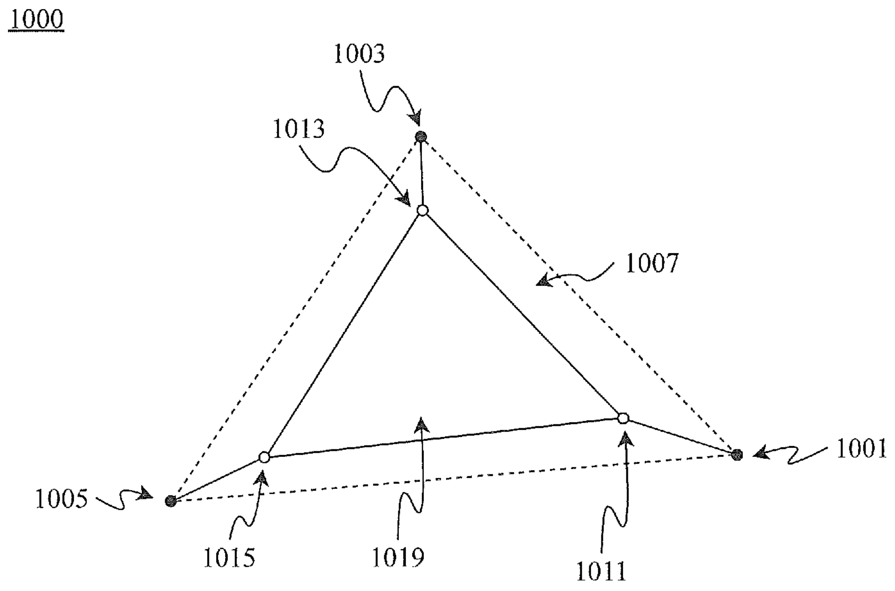
FIG. 10 illustrates a schematic diagram of a chromaticity plane according to some embodiments of the present disclosure.

FIG. 10 illustrates a schematic diagram of a chromaticity plane 1000 according to some embodiments of the present disclosure. Three chromaticity coordinate points 1001, 1003, and 1005 may be the typical three primary colors, e.g., red, green, and blue. The color gamut 1007 formed by the three dashed lines may be defined by the chromaticity coordinate points 1001, 1003, and 1005. The virtual color gamut 1019 may be defined by the solid lines and the chromaticity coordinate points 1001, 1003, and 1005. In other words, the virtual color gamut 1019 includes the triangle defined by the solid lines and the chromaticity coordinate points 1001, 1003, and 1005 but excludes the chromaticity coordinate points 1011, 1013, and 1015.

After the virtual color gamut 1019 is applied to the display 100, if a pixel is instructed to display a given primary color, the compensations from other primary colors may be cancelled and the component of the given primary color may be increased. After the virtual color gamut 1019 is applied to the display 100, if a pixel is instructed to display the color at the chromaticity coordinate point 1011, the pixel would be instructed to display the color at the chromaticity coordinate point 1001. If a pixel is instructed to display the color at the chromaticity coordinate point 1013, the pixel would be instructed to display the color at the chromaticity coordinate point 1003. If a pixel is instructed to display the color at the chromaticity coordinate point 1015, the pixel would be instructed to display the color at the chromaticity coordinate point 1005. In this way, the problem of an insufficient mixture of lights can be overcome, and more saturated primary color can be displayed.

The virtual color gamut 1019 may be obtained by (1) obtaining a first virtual color gamut according to the embodiments associated with FIGS. 3A and 4-7 and (2) replacing chromaticity coordinate points 1011, 1013, and 1015 with chromaticity coordinate points 1001, 1003, and 1005, respectively. The virtual color gamut 1019 includes the triangle defined by the solid lines and the chromaticity coordinate points 1001, 1003, and 1005, but excludes the chromaticity coordinate points 1011, 1013, and 1015. The virtual color gamut 1019 may be among the color areas defined by the sub-pixels (e.g., the colors areas 501, 503, and 505 and the color areas defined by groups 401, 403, and 405) and does not overlap any of the color areas (e.g., the colors areas 501, 503, and 505 and the color areas defined by groups 401, 403, and 405).

In some embodiments, the chromaticity coordinate point 1001 may be one of the chromaticity coordinate points of the plurality of first sub-pixels of the display 100. The chromaticity coordinate point 1003 may be one of the chromaticity coordinate points of the plurality of second sub-pixels of the display 100. The chromaticity coordinate point 1005 may be one of the chromaticity coordinate points of the plurality of third sub-pixels of the display 100.

In some embodiments, the chromaticity coordinate point 1001 may be the center of the color area defined by the plurality of first sub-pixels of the display 100 (e.g., the center of the colors area 501 or the center of the color area defined by group 401). The chromaticity coordinate point 1003 may be the center of the color area defined by the plurality of second sub-pixels of the display 100 (e.g., the center of the colors area 503 or the center of the color area defined by group 403). The chromaticity coordinate point 1005 may be the center of the color area defined by the plurality of third sub-pixels of the display 100 (e.g., the center of the colors area 505 or the center of the color area defined by group 405).

In some embodiments, a pixel of the display 100 may include four sub-pixels, e.g., red, green, blue, and white (R, G, B, W) sub-pixels as shown in FIG. 2C or the red, green, blue, and yellow (R, G, B, Y) sub-pixels as shown in FIG. 2D. The chromaticity plane 1000 may include a fourth color area associated with the fourth color (which is other than red, green, and blue, e.g., white or yellow). The virtual color gamut 1019 may further include a chromaticity coordinate point of the fourth color and may not overlap the fourth color area on the chromaticity plane.

Figure 11:
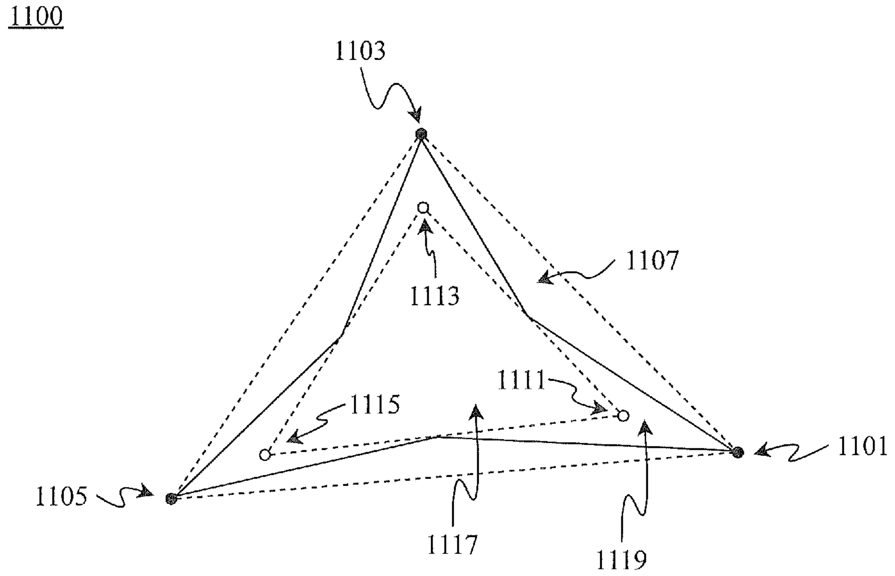
FIG. 11 illustrates a schematic diagram of a chromaticity plane according to some embodiments of the present disclosure.

FIG. 11 illustrates a schematic diagram of a chromaticity plane 1100 according to some embodiments of the present disclosure. Three chromaticity coordinate points 1101, 1103, and 1105 may be the typical three primary colors, e.g., red, green, and blue. The color gamut 1107 may be a triangle defined by the chromaticity coordinate points 1101, 1103, and 1105. The virtual color gamut 1117 defined by the chromaticity coordinate points 1111, 1113, and 1115 may be obtained according to the embodiments associated with FIGS. 3A and 4-7. The virtual color gamut 1119 may be defined by the solid lines and the chromaticity coordinate points 1101, 1103, and 1105.

In the embodiments associated with FIG. 11, the compensation matrix or values obtained according to the embodiments associated with FIGS. 3A and 4-7 are further processed with linear weighting. Therefore, when a pixel is instructed to display the color close to a given monochrome (or primary color) (e.g., the color at the chromaticity coordinate points 1111, 1113, or 1115), the component of the given monochrome (or primary color) is increased and the components of other monochromes (or primary colors) are decreased. Please note that the weight values of the linear weighting (i.e., the slopes as shown in FIG. 11) can be adjusted according to needs and is not limited to the embodiment indicated by FIG. 11.

The virtual color gamut 1119 is obtained through further processing virtual color gamut 1117 (e.g., obtained according to the embodiments associated with FIGS. 3A and 4-7) with linear weighting. The virtual color gamut 1119 may be among the color areas defined by the sub-pixels (e.g., the colors areas 501, 503, and 505 and the color areas defined by groups 401, 403, and 405) and does not overlap any of the color areas (e.g., the colors areas 501, 503, and 505 and the color areas defined by groups 401, 403, and 405).

With respect to the virtual color gamut 1117, the virtual color gamut 1119 may further include one or more boomerang-shaped areas. As shown in FIG. 11, the virtual color gamut 1119 may further include three boomerang-shaped areas with respect to the virtual color gamut 1117. Wings of the boomerang-shaped areas may be attached to the virtual color gamut 1117. In the embodiments associated with FIG. 11, outer edges of the wings of the boomerang-shaped areas may be linear.

Using the virtual color gamut 1119, not only can the problem of an insufficient mixture of lights be overcome, but also the colors around the chromaticity coordinate points 1111, 1113, and 1115 would vary more smoothly.

In some embodiments, the chromaticity coordinate point 1101 may be one of the chromaticity coordinate points of the plurality of first sub-pixels of the display 100. The chromaticity coordinate point 1103 may be one of the chromaticity coordinate points of the plurality of second sub-pixels of the display 100. The chromaticity coordinate point 1105 may be one of the chromaticity coordinate points of the plurality of third sub-pixels of the display 100.

In some embodiments, the chromaticity coordinate point 1101 may be the center of the color area defined by the plurality of first sub-pixels of the display 100 (e.g., the center of the colors area 501 or the center of the color area defined by group 401). The chromaticity coordinate point 1103 may be the center of the color area defined by the plurality of second sub-pixels of the display 100 (e.g., the center of the colors area 503 or the center of the color area defined by group 403). The chromaticity coordinate point 1105 may be the center of the color area defined by the plurality of third sub-pixels of the display 100 (e.g., the center of the colors area 505 or the center of the color area defined by group 405).

In some embodiments, a pixel of the display 100 may include four sub-pixels, e.g., red, green, blue, and white (R, G, B, W) sub-pixels as shown in FIG. 2C or the red, green, blue, and yellow (R, G, B, Y) sub-pixels as shown in FIG. 2D. The chromaticity plane 1100 may include a fourth color area associated with the fourth color (which is other than red, green, and blue, e.g., white or yellow). The virtual color gamut 1119 may further include a chromaticity coordinate point of the fourth color and may not overlap the fourth color area on the chromaticity plane.

Figure 12:
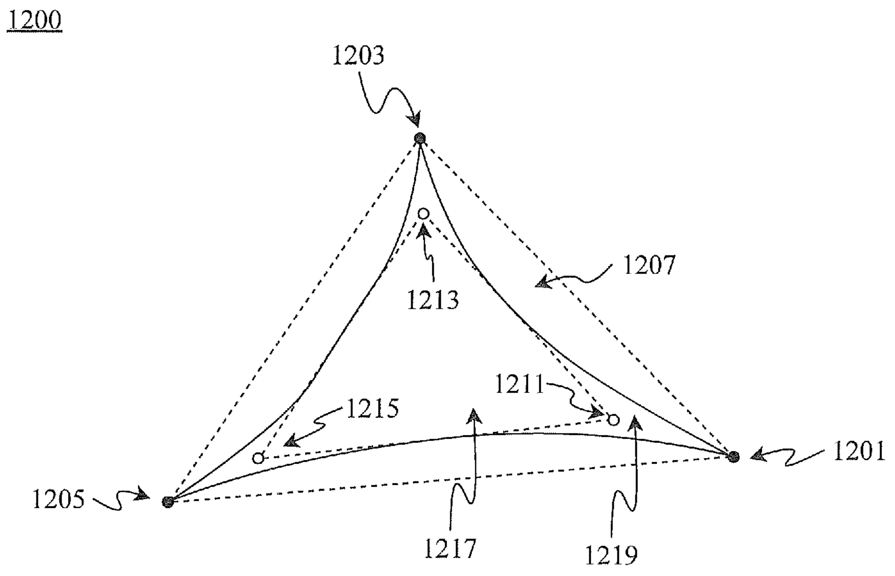
FIG. 12 illustrates a schematic diagram of a chromaticity plane according to some embodiments of the present disclosure.

FIG. 12 illustrates a schematic diagram of a chromaticity plane 1200 according to some embodiments of the present disclosure. Three chromaticity coordinate points 1201, 1203, and 1205 may be the typical three primary colors, e.g., red, green, and blue. The color gamut 1207 may be a triangle defined by the chromaticity coordinate points 1201, 1203, and 1205. The virtual color gamut 1217 defined by the chromaticity coordinate points 1211, 1213, and 1215 may be obtained according to the embodiments associated with FIGS. 3A and 4-7. The virtual color gamut 1219 may be defined by the solid lines and the chromaticity coordinate points 1201, 1203, and 1205.

In the embodiments associated with FIG. 12, the compensation matrix or values obtained according to the embodiments associated with FIGS. 3A and 4-7 are further processed with curve weighting. Therefore, when a pixel is instructed to display the color close to a given monochrome (or primary color) (e.g., the color at the chromaticity coordinate points 1211, 1213, or 1215), the component of the given monochrome (or primary color) is increased and the components of other monochromes (or primary colors) are decreased. The curvature of the curve converging to the virtual color gamut 1217 (i.e., the triangle defined by the chromaticity coordinate points 1211, 1213, and 1215) can be adjusted by the weight values. The curvature of the curve converging to the virtual color gamut 1217 is not limited to the embodiment indicated by FIG. 12.

The virtual color gamut 1219 is obtained through further processing virtual color gamut 1217 (e.g., obtained according to the embodiments associated with FIGS. 3A and 4-7) with curve weighting. The virtual color gamut 1219 may be among the color areas defined by the sub-pixels (e.g., the colors areas 501, 503, and 505 and the color areas defined by groups 401, 403, and 405) and does not overlap any of the color areas (e.g., the colors areas 501, 503, and 505 and the color areas defined by groups 401, 403, and 405).

With respect to the virtual color gamut 1217, the virtual color gamut 1219 may further include one or more boomerang-shaped areas. As shown in FIG. 12, the virtual color gamut 1219 may further include three boomerang-shaped areas with respect to the virtual color gamut 1217. Wings of the boomerang-shaped areas may be attached to the virtual color gamut 1217. In the embodiments associated with FIG. 12, outer edges of the wings of the boomerang-shaped areas may be concave curves.

Using the virtual color gamut 1219, not only can the problem of an insufficient mixture of lights be overcome, but also the colors around the chromaticity coordinate points 1211, 1213, and 1215 would vary more smoothly.

In some embodiments, the chromaticity coordinate point 1201 may be one of the chromaticity coordinate points of the plurality of first sub-pixels of the display 100. The chromaticity coordinate point 1203 may be one of the chromaticity coordinate points of the plurality of second sub-pixels of the display 100. The chromaticity coordinate point 1205 may be one of the chromaticity coordinate points of the plurality of third sub-pixels of the display 100.

In some embodiments, the chromaticity coordinate point 1201 may be the center of the color area defined by the plurality of first sub-pixels of the display 100 (e.g., the center of the colors area 501 or the center of the color area defined by group 401). The chromaticity coordinate point 1203 may be the center of the color area defined by the plurality of second sub-pixels of the display 100 (e.g., the center of the colors area 503 or the center of the color area defined by group 403). The chromaticity coordinate point 1205 may be the center of the color area defined by the plurality of third sub-pixels of the display 100 (e.g., the center of the colors area 505 or the center of the color area defined by group 405).

In some embodiments, a pixel of the display 100 may include four sub-pixels, e.g., red, green, blue, and white (R, G, B, W) sub-pixels as shown in FIG. 2C or the red, green, blue, and yellow (R, G, B, Y) sub-pixels as shown in FIG. 2D. The chromaticity plane 1200 may include a fourth color area associated with the fourth color (which is other than red, green, and blue, e.g., white or yellow). The virtual color gamut 1219 may further include a chromaticity coordinate point of the fourth color and may not overlap the fourth color area on the chromaticity plane.

Equation (2) shows an exemplary compensation matrix $M_k$ according to some embodiments of the present disclosure. Equation (2) may be associated with the embodiments of FIGS. 3C and 10-12. Equation (2) shows the relationship between an input value for a given pixel, a compensation matrix for the given pixel, and an output value for the given pixel. The input value may be included in input image data. The output value may be included in output image data. Equation (2) may be calculated or processed by the processor 131 of the control circuit 130. The compensation matrix $M_k$ may be stored in the storage device 132 of the control circuit 130. Based on the output value for the given pixel, the corresponding control signal for the given pixel may be generated and output by the display driver 133 of the control circuit 130.

$$M_k I = S = \begin{bmatrix} M_{rr} & M_{gr}K_g & M_{br}K_b \\ M_{rg}K_r & M_{gg} & M_{bg}K_b \\ M_{rb}K_r & M_{gb}K_g & M_{bb} \end{bmatrix} \begin{bmatrix} R \\ G \\ B \end{bmatrix} = \begin{bmatrix} S_r \\ S_g \\ S_b \end{bmatrix} \quad \text{Equation (2)}$$

In Equation (2), the matrix I consisting of R, G, and B indicates the input value for a given pixel specified in the input image data. The matrix I consisting of R, G, and B includes red, green, and blue signal values for the red sub-pixel, the green sub-pixel, and the blue sub-pixel of the given pixel specified in the input image data. In particular, R indicates the red signal value for the red sub-pixel of the given pixel, G indicates the green signal value for the green sub-pixel of the given pixel, and B indicates the blue signal value for the blue sub-pixel of the given pixel.

In Equation (2), the matrix S consisting of $S_r$, $S_g$, and $S_b$ indicates the output value for a given pixel. The matrix S consisting of $S_r$, $S_g$, and $S_b$ includes red, green, and blue lighting signal values for the red sub-pixel, the green sub-pixel, and the blue sub-pixel of the given pixel. In particular, $S_r$ indicates the red lighting signal value for lighting the red sub-pixel of the given pixel of the display 100, $S_g$ indicates the green lighting signal value for lighting the green sub-pixel of the given pixel of the display 100, and $S_b$ indicates the blue lighting signal value for lighting the blue sub-pixel of the given pixel of the display 100. Based on $S_r$, $S_g$, and $S_b$ for the given pixel of the display 100, the corresponding control signals for the sub-pixels of the given pixel may be generated and output by the display driver 133 of the control circuit 130.

In Equation (2), the matrix $M_k$ consisting of $M_{rr}$, $M_{rg}K_r$, $M_{rb}K_r$, $M_{gr}K_g$, $M_{gg}$, $M_{gb}K_g$, $M_{br}K_b$, $M_{bg}K_b$, and $M_{bb}$ indicates the compensation matrix for a given pixel. $M_{rr}$, indicates the amount of red lighting signal value (i.e., $S_r$) necessary for the red signal value (i.e., R). $M_{rg}$ indicates the amount of green lighting signal value (i.e., $S_g$) necessary for the red signal value (i.e., R). $M_{rb}$ indicates the amount of blue lighting signal value (i.e., $S_b$) necessary for the red signal value (i.e., R). $M_{gr}$ indicates the amount of red lighting signal value (i.e., $S_r$) necessary for the green signal value (i.e., G). $M_{gg}$ indicates the amount of green lighting signal value (i.e., $S_g$) necessary for the green signal value (i.e., G). $M_{gb}$ indicates the amount of blue lighting signal value (i.e., $S_b$) necessary for the green signal value (i.e., G). $M_{br}$ indicates the amount of red lighting signal value (i.e., $S_r$) necessary for the blue signal value (i.e., B). $M_{bg}$ indicates the amount of green lighting signal value (i.e., $S_g$) necessary for the blue signal value (i.e., B). $M_{bb}$ indicates the amount of blue lighting signal value (i.e., $S_b$) necessary for the blue signal value (i.e., B).

The weight values of $K_r$, $K_g$, and $K_b$ in the matrix $M_k$ may be associated with the R, G, and B. R indicates the red signal value for the red sub-pixel of the given pixel. G indicates the green signal value for the green sub-pixel of the given pixel. B indicates the blue signal value for the blue sub-pixel of the given pixel. An exemplary embodiment for the weight values of $K_r$, $K_g$, and Kb are defined by Equations (3) to (5).

$$K_r=\min(1,(G^S+B^S)/R) \quad \text{Equation (3)}$$

$$K_y=\min(1,(R^S+B^S)/G) \quad \text{Equation (4)}$$

$$K_b=\min(1,(R^S+G^S)/B) \quad \text{Equation (5)}$$

Figure 13:
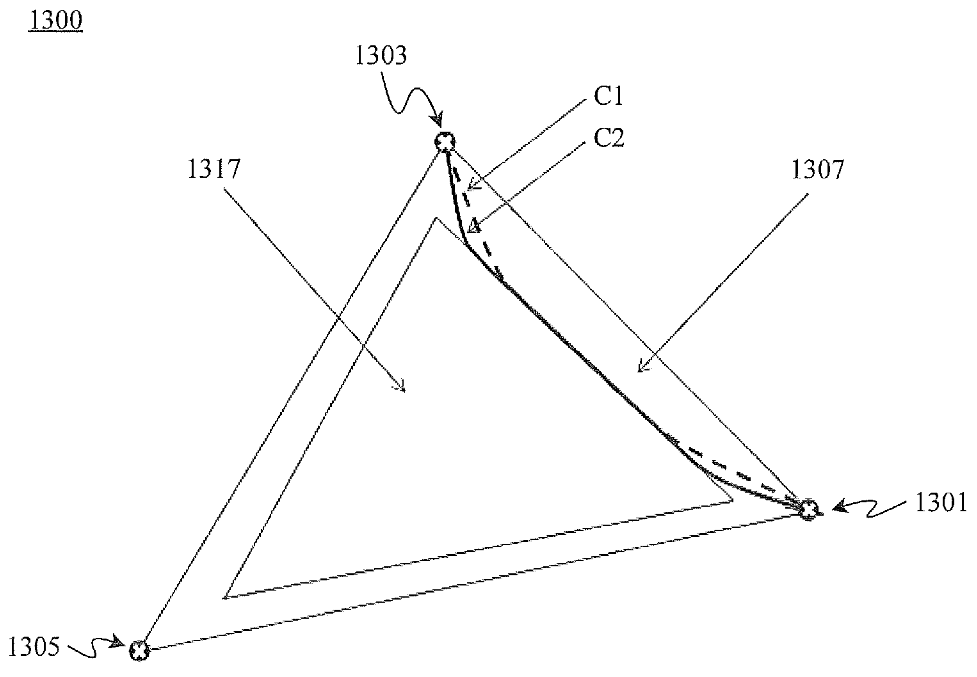
FIG. 13 illustrates a schematic diagram of a chromaticity plane according to some embodiments of the present disclosure.

FIG. 13 illustrates a schematic diagram of a chromaticity plane 1300 according to some embodiments of the present disclosure. Three chromaticity coordinate points 1301, 1303, and 1305 may be the three primary colors, e.g., red, green, and blue. The color gamut 1307 may be a triangle defined by the chromaticity coordinate points 1301, 1303, and 1305. The virtual color gamut 1317 may be correspond to the virtual color gamut 1217 in FIG. 12. The weight values of $K_r$, $K_g$, and $K_b$ in the matrix $M_k$ are defined by Equations (3) to (5), and the curves C1 and C2 may be defined. The curve C1 may be defined when s in Equations (3) to (5) equals 0.9. The curve C2 may be defined when s in Equations (3) to (5) equals 2.

After the virtual chromaticity coordinate points (e.g., the points 411, 413, and 415 in FIG. 4; the points 421, 423, and 425 in FIG. 5; the points 511, 513, and 515 in FIG. 6; or the points 521, 523, and 525 in FIG. 7) and the corresponding virtual color gamut with linear weighting or curve weighting are determined, the compensation matrixes $M_k$ for each pixel can be calculated or determined.

After linear weighting or curve weighting is applied, no compensation would be applied to the pixels of the display 100 when they display a monochrome (or primary color). The illuminance may be uneven when pixels of the display 100 display a monochrome (or primary color). The illuminance may be uneven, especially when the entire screen of the display 100 displays a monochrome (or primary color). To overcome this issue, correction values for monochromes (or primary colors) may be added to the matrix $M_k$ to obtain the matrix $M_{k2}$.

Equation (6) shows an exemplary compensation matrix $M_{k2}$ according to some embodiments of the present disclosure. Equation (6) shows the relationship between an input value for a given pixel, a compensation matrix for the given pixel, and an output value for the given pixel. The input value may be included in input image data. The output value may be included in output image data. Equation (6) may be calculated or processed by the processor 131 of the control circuit 130. The compensation matrix $M_{k2}$ may be stored in the storage device 132 of the control circuit 130. Based on the output value for the given pixel, the corresponding control signal for the given pixel may be generated and output by the display driver 133 of the control circuit 130.

$$M_{k2}I = S = \begin{bmatrix} M_{rr}K_0 & M_{gr}K_g & M_{br}K_b \\ M_{rg}K_r & M_{gg}K_1 & M_{bg}K_b \\ M_{rb}K_r & M_{gb}K_g & M_{bb}K_2 \end{bmatrix} \begin{bmatrix} R \\ G \\ B \end{bmatrix} = \begin{bmatrix} S_r \\ S_g \\ S_b \end{bmatrix} \quad \text{Equation (6)}$$

An exemplary embodiment for the weight values of $K_0$, $K_1$, and $K_2$ are defined by Equations (7) to (9).

$$K_0 = K_r + \frac{(1 - K_r)P_{ri}}{M_{rr}} \quad \text{Equation (7)}$$

$$K_1 = K_g + \frac{(1 - K_g)P_{gi}}{M_{gg}} \quad \text{Equation (8)}$$

$$K_2 = K_b + \frac{(1 - K_b)P_{bi}}{M_{bb}} \quad \text{Equation (9)}$$

In Equation (7), $P_{ri}$ indicates a percentage for the light emitted by the red sub-pixel in i-th pixel. In particular, $P_{ri}$ indicates the amount of light emitted by the red sub-pixel in i-th pixel such that the X, Y, and Z tristimulus values are corrected to the given values while displaying the red primary color. For example, if the $P_{ri}$ equals to 0.6, the amount of light emitted by the red sub-pixel in i-th pixel would be reduced to 60% of the original amount of light so as to correct the X, Y, and Z tristimulus values to the given values while displaying the red primary color.

In Equation (8), $P_{gi}$ indicates a percentage for the light emitted by the green sub-pixel in i-th pixel. In particular, $P_{gi}$ indicates the amount of light emitted by the green sub-pixel in i-th pixel such that the X, Y, and Z tristimulus values are corrected to the given values while displaying the green primary color.

In Equation (8), $P_{bi}$ indicates a percentage for the light emitted by the blue sub-pixel in i-th pixel. In particular, $P_{bi}$ indicates the amount of light emitted by the blue sub-pixel in i-th pixel such that the X, Y, and Z tristimulus values are corrected to the given values while displaying the blue primary color.

The scope of the present disclosure is not intended to be limited to the particular embodiments of the process, machine, manufacture, and composition of matter, means, methods, steps, and operations described in the specification. As those skilled in the art will readily appreciate from the disclosure of the present disclosure, processes, machines, manufacture, composition of matter, means, methods, steps, or operations presently existing or later to be developed, that perform substantially the same function or achieve substantially the same result as the corresponding embodiments described herein may be utilized according to the present disclosure. Accordingly, the appended claims are intended to include within their scope such processes, machines, manufacture, and compositions of matter, means, methods, steps, or operations. In addition, each claim constitutes a separate embodiment, and the combination of various claims and embodiments are within the scope of the disclosure.

The methods, processes, or operations according to embodiments of the present disclosure can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of the present disclosure.

An alternative embodiment preferably implements the methods, processes, or operations according to embodiments of the present disclosure in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor, but the instructions may alternatively or additionally be executed by any suitable dedicated hardware device. For example, an embodiment of the present disclosure provides a non-transitory, computer-readable storage medium having computer programmable instructions stored therein.

While the present disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the present disclosure by simply employing the elements of the independent claims. Accordingly, embodiments of the present disclosure as set forth herein are intended to be illustrative, not limiting. Various changes may be made without departing from the spirit and scope of the present disclosure.

Even though numerous characteristics and advantages of the present disclosure have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An electronic device, comprising:

a display including an array of pixels, wherein pixels in the array comprise a plurality of first sub-pixels defining a first color area in a chromaticity plane, a plurality of second sub-pixels defining a second color area in the chromaticity plane, and a plurality of third sub-pixels defining a third color area in the chromaticity plane, and wherein the plurality of first sub-pixels is associated with a first primary color, the plurality of second sub-pixels is associated with a second primary color, and the plurality of third sub-pixels is associated with a third primary color;

a control circuit, electrically connected to the display, configured to receive an input image signal and generate a control signal to the display for driving each pixel of the display to output light in a virtual color gamut;

wherein the virtual color gamut of the display includes a first virtual color gamut including a first chromaticity coordinate point of the first color area, a second virtual color gamut including a second chromaticity coordinate point of the second color area, a third virtual color gamut including a third chromaticity coordinate point of the third color area, and a fourth virtual color gamut, wherein the fourth virtual color gamut is defined based on the first color area, the second color area, and the third color area, and the fourth virtual color gamut is among the first, second and third color areas on the chromaticity plane and does not overlap any of the first, second or third color areas.

2. The electronic device of claim 1, wherein the plurality of first sub-pixels emit red light, the plurality of second sub-pixels emit green light, and the plurality of third sub-pixels emit blue light.

3. The electronic device of claim 1, wherein the pixels in the array further include a plurality of fourth sub-pixels defining a fourth color area associated with a fourth primary color, and the virtual color gamut of the display further includes a fifth virtual color gamut including a fourth chromaticity coordinate point of the fourth color area and does not overlap the fourth color area on the chromaticity plane.

4. The electronic device of claim 1, wherein the first virtual color gamut is a first boomerang-shaped area, a protrusion of the first boomerang-shaped area is the first chromaticity coordinate point, and two wings of the first boomerang-shaped area are attached to the fourth virtual color gamut.

5. The electronic device of claim 4, wherein the second virtual color gamut is a second boomerang-shaped area, a protrusion of the second boomerang-shaped area is the second chromaticity coordinate point, and two wings of the second boomerang-shaped area are attached to the fourth virtual color gamut.

6. The electronic device of claim 5, wherein the third virtual color gamut is a third boomerang-shaped area, a protrusion of the third boomerang-shaped area is the third chromaticity coordinate point, and two wings of the second boomerang-shaped area are attached to the fourth virtual color gamut.

7. The electronic device of claim 4, wherein outer edges of the two wings of the first boomerang-shaped area are linear.

8. The electronic device of claim 4, wherein outer edges of the two wings of the first boomerang-shaped area are concave curves.

9. The electronic device of claim 1, wherein one of the chromaticity coordinate points of the plurality of first sub-pixels is assigned as the first chromaticity coordinate point.

10. The electronic device of claim 1, wherein the first color area can be represented by a first circle, and a center of the first circle is assigned as the first chromaticity coordinate point.

11. The electronic device of claim 1, wherein the first chromaticity coordinate point is a typical chromaticity coordinate point of the plurality of first sub-pixels.

12. A method of operating a display, comprising:
receiving an input image signal for the display; and
generating a control signal based on the input image signal and a compensation matrix to drive the display,
wherein the display includes an array of pixels and is configured to output light in a virtual color gamut according to the control signal, wherein pixels in the array comprise a plurality of first sub-pixels defining a first color area in a chromaticity plane, a plurality of second sub-pixels defining a second color area in the chromaticity plane, and a plurality of third sub-pixels defining a third color area in the chromaticity plane,
wherein the plurality of first sub-pixels is associated with a first primary color, the plurality of second sub-pixels is associated with a second primary color, and the plurality of third sub-pixels is associated with a third primary color; and
wherein the virtual color gamut of the display includes a first virtual color gamut including a first chromaticity coordinate point of the first color area, a second virtual color gamut including a second chromaticity coordinate point of the second color area, a third virtual color gamut including a third chromaticity coordinate point of the third color area, and a fourth virtual color gamut,
wherein the fourth virtual color gamut is defined based on the first color area, the second color area, and the third color area, and the fourth virtual color gamut is among the first, second and third color areas on the chromaticity plane and does not overlap any of the first, second or third color areas.

13. The method of claim 12, wherein the first virtual color gamut is a first boomerang-shaped area, a protrusion of the first boomerang-shaped area is the first chromaticity coordinate point, and two wings of the first boomerang-shaped area are attached to the fourth virtual color gamut.

14. A method for compensating colors of a display, the display comprising an array of pixels, wherein pixels in the array comprise a plurality of first sub-pixels defining a first color area in a chromaticity plane, a plurality of second sub-pixels defining a second color area in the chromaticity plane, and a plurality of third sub-pixels defining a third color area in the chromaticity plane, and wherein the plurality of first sub-pixels is associated with a first primary color, the plurality of second sub-pixels is associated with a second primary color, and the plurality of third sub-pixels is associated with a third primary color, the method comprising:
determining a first chromaticity coordinate point of the first color area, a second chromaticity coordinate point of the second color area, and a third chromaticity coordinate point of the third color area;
determining a compensation matrix for generating a control signal based on an input image signal, wherein the control signal controls each pixel of the display to emit light in a virtual color gamut,
wherein the virtual color gamut includes a first virtual color gamut including the first chromaticity coordinate point, a second virtual color gamut including the second chromaticity coordinate point, a third virtual color gamut including the third chromaticity coordinate point, and a fourth virtual color gamut,
wherein the fourth virtual color gamut is defined based on the first color area, the second color area, and the third color area, and the fourth virtual color gamut is among the first, second and third color areas on the chromaticity plane and does not overlap any of the first, second or third color areas; and
determining at least a first luminance adjustment parameter, such that light on the first chromaticity coordinate point is emitted when a pixel is controlled to emit light of the first primary color.

* * * * *